United States Patent
Larsson

(10) Patent No.: US 7,933,549 B2
(45) Date of Patent: Apr. 26, 2011

(54) METHOD AND ARCHITECTURE FOR WIRELESS COMMUNICATION NETWORKS USING COOPERATIVE RELAYING

(75) Inventor: Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1750 days.

(21) Appl. No.: 10/855,888

(22) Filed: May 28, 2004

(65) Prior Publication Data
US 2004/0266339 A1 Dec. 30, 2004

Related U.S. Application Data

(60) Provisional application No. 60/473,450, filed on May 28, 2003.

(51) Int. Cl.
H04B 3/26 (2006.01)
(52) U.S. Cl. ............................................. 455/7; 370/315
(58) Field of Classification Search ............. 455/7–11.1, 455/14–25; 370/315
See application file for complete search history.

(56) References Cited

U.S. PATENT DOCUMENTS

| | | | |
|---|---|---|---|
| 5,970,061 A | 10/1999 | Kokudo | |
| 5,987,011 A * | 11/1999 | Toh | 370/331 |
| 6,269,250 B1 * | 7/2001 | Bender et al. | 455/522 |
| 6,456,853 B1 | 9/2002 | Arnold | |
| 6,868,254 B2 | 3/2005 | Weissman | |
| 6,889,033 B2 | 5/2005 | Bongfeldt | |
| 7,006,461 B2 | 2/2006 | Kilfoyle et al. | |
| 7,046,960 B2 | 5/2006 | Takemoto et al. | |
| 7,050,758 B2 | 5/2006 | Dalgleish et al. | |
| 7,110,715 B2 * | 9/2006 | Gupta | 455/11.1 |
| 7,139,527 B2 | 11/2006 | Tamaki et al. | |
| 7,161,973 B2 * | 1/2007 | Ghosh | 375/147 |
| 2005/0014464 A1 | 1/2005 | Larsson | |

OTHER PUBLICATIONS

An Efficient Protocol for realizing distributed spatial diversity, in Wireless Ad-Hoc Networks. J. Nicholas Laneman, Gregory W. Wornell, Mar. 2001.*
Office Action mailed Jan. 31, 2007 in corresponding U.S. Appl. No. 10/855,898.
Final Office Action mailed Sep. 7, 2007 in corresponding U.S. Appl. No. 10/855,898.
U.S. Office Action mailed Apr. 22, 2008 in corresponding U.S. Appl. No. 10/855,898.
Oct. 3, 2007 Office Action for U.S. Appl. No. 10/855,888.
Laneman et al, "An Efficient Protocol for Realizing Distributed Spatial Diversity in Wireless Ad-Hoc Networks," in *Proc. of ARL FedLab Symposium on Advanced telecommunications and Information Distribution (ATIRP-2001)*, (College Park, MD), Mar. 2001.

(Continued)

*Primary Examiner* — Raymond S Dean
(74) *Attorney, Agent, or Firm* — Nixon & Vanderhye, P.C.

(57) ABSTRACT

The present invention relates to wireless networks using cooperative relaying which in a communication session involve more than one relay station. In the method according to the present invention, a transmitter $210'$, a receiver $220'$ and at least one relay station $215$ are engaged in a communication session. The relay station $215$ forwards signals from a first link between the transmitter $210'$ and the relay station $215$ to a second link between the relay stations $215$ and the receiver $220'$. The relay station $215$ forwards the signal with the use of a relative transmission parameter and optionally a common transmission parameter. The relative transmission parameter is determined locally in each relay station $215$ and based on a characterization of a first link, or the second link or a combination of the first and second link.

42 Claims, 8 Drawing Sheets

OTHER PUBLICATIONS

Laneman et al, "Energy-Efficient Antenna-Sharing and Relaying for Wireless Networks," in *Proc. IEEE Wireless Communications and Networking Conference (WCNC-2000)*, (Chicago, IL), Sep. 2000.

Schein et al, "The Gaussian parallel relay network," in IEEE International Symposium on Information Theory ISIT2000, Sorrento, Italy, Jun. 25-30, 2000.

Laneman et al, "*Cooperative Diversity in Wireless Networks: Algorithms and Architectures*," Ph.D. Thesis, Massachusetts Institute of Technology, Cambridge, MA, Aug. 2002.

Van Der Meulen, "Three-terminal communication channels," Advances in Applied Prob- ability, vol. 3, pp. 120 154, 1971, May 1971.

G. W. Wornell, V. Poor, Wireless Communications: Signal Processing Perspectives (Prentice Hall Signal Processing Series) Prentice Hall; 1st edition (Apr. 1998), pp. 47-48.

Kramer et al, "Capacity theorems for wireless relay channels," presented at the 41$^{st}$ Allerton Conf. on Comm. Control and Comp., Oct. 1-3, 2003.

Sendonaris et al, "Increasing Uplink Capacity via User Cooperation Diversity", ISIT Aug. 16-21, 1998, Cambridge, MA, p. 156.

Schein, "Distributed Coordination in Network Information Theory", PhD thesis, Oct. 2002, MIT, Cambridge, MA.

Dohler et al, "Virtual Antenna Arrays for Future Wireless Mobile Communication Systems", ICT 2002, Jun. 2002.

U.S. Office Action mailed Sep. 16, 2008 in U.S. Appl. No. 10/855,898.

Chinese Office Action and English translation thereof mailed Apr. 3, 2009 in corresponding Chinese application 200480014781.4.

English translation of Taiwanese Office Action mailed Dec. 23, 2010 in Taiwanese application 0931315135.

Laneman et al, "An Efficient Protocol for Realizing Distributed Spatial Diversity in Wireless Ad-Hoc Networks", in Proc. ARL FebLab Symp. On Adv. Telecomm. & Inform. Distrib. Prog. (ATIRP), College Park, MD, Mar. 2001.

\* cited by examiner

US 7,933,549 B2

METHOD AND ARCHITECTURE FOR WIRELESS COMMUNICATION NETWORKS USING COOPERATIVE RELAYING

This application claims priority to U.S. Provisional Application No. 60/473,450 filed 28 May 2003. The entire contents of this application is incorporated herein by reference.

FIELD OF THE INVENTION

The present invention relates to relay supported wireless communication to enhance communication performance. In particular the invention relates to wireless networks using cooperative relaying.

BACKGROUND

A main striving force in the development of wireless/cellular communication networks and systems is to provide, apart from many other aspects, increased coverage or support of higher data rate, or a combination of both. At the same time, the cost aspect of building and maintaining the system is of great importance and is expected to become even more so in the future. As data rates and/or communication distances are increased, the problem of increased battery consumption is another area of concern.

Until recently the main topology of wireless networks has been fairly unchanged, including the three existing generations of cellular networks. The topology characterized by the cellular architecture with the fixed radio base stations and the mobile stations as the transmitting and receiving entities in the networks, wherein a communication typically only involves these two entities. An alternative approach to networks are exemplified by the well-known multihop networks, wherein typically, in a wireless scenario, a communication involves a plurality of transmitting and receiving entities in a relaying configuration. Such systems offer possibilities of significantly reduced path loss between communicating (relay) entities, which may benefit the end-to-end (ETE) users.

Attention has recently been given to another type of topology that has many features and advantages in common with the multihop networks but is limited to only two (or a few) hop relaying. In contrast to multihop networks, aforementioned topology exploits aspects of parallelism and also adopts themes from advanced antenna systems. These networks, utilizing the new type of topology, have cooperation among multiple stations as a common denominator. In recent research literature, it goes under several names, such as cooperative relying, cooperative diversity, cooperative coding, virtual antenna arrays, etc. In the present application the terms "cooperative relaying" and "cooperative schemes/methods" is meant to encompass all systems and networks utilizing cooperation among multiple stations and the scheme/methods used in the systems, respectively. A comprehensive overview of cooperative communication schemes are given in [1]. Various formats of a relayed signal may be deployed. A signal may be decoded, re-modulated and forwarded, or alternatively simply amplified and forwarded. The former is known as decode-and-forward or regenerative relaying, whereas the latter is known as amplify-and-forward, or non-regenerative relaying. Both regenerative and non-regenerative relaying is well known, e.g. by traditional multihopping and repeater solutions respectively. Various aspects of the two approaches are addressed in [2].

The general benefits of cooperative relaying in wireless communication can be summarized as higher data rates, reduced outage (due to different forms of diversity), increased battery life, extended coverage (e.g. for cellular).

Various schemes and topologies utilizing cooperative relaying has been suggested, as theoretical models within the area of information theory, as suggestions for actual networks and in a few cases as laboratory test systems, for example. Examples are found in [1] pages 37-39, 41-44. The various cooperation schemes may be divided based on which entities have data to send, to whom and who cooperates. In FIGS. 1a-f (prior art) different topologies are schematically illustrated, showing where traffic is generated, who is the receiver and the path for radio transmissions.

The classical relay channel, illustrated in FIG. 1a, consists of a source that wishes to communicate with a destination through the use of relays. The relay receives the signal transmitted by the source through a noisy channel, process it and forwards it to the destination. The destination observes a superposition of the source and the relay transmission. The relay does not have any information to send; hence the goal of the relay is to maximize the total rate of information flow from the source to the destination. The classical relay channel has been studied in [1], [7] and in [3] where receiver diversity was incorporated in the latter. The classical relay channel, in its three-station from, does not exploit multiple relay stations at all, and hence does not provide the advantages stated above.

A more promising approach, parallel relay channel, is schematically illustrated in FIG. 1b, wherein a wireless systems employing repeaters (such as cellular basestation with supporting repeaters) with overlapping coverage, a receiver may benefit of using super-positioned signals received from multiple repeaters. This is something that happens automatically in systems when repeaters are located closely. Recently, information theoretical studies have addressed this case. A particular case of interest is by Schein, [4] and [5]. Schein has performed information theoretical study on a cooperation-oriented network with four nodes, i.e. with one transmitter, one receiver and only two intermediately relays. A real valued channel with propagation loss equal to one is investigated. Each relay employs non-regenerative relaying, i.e. pure amplification. Thanks to the simplistic assumption of real valued propagation loss, the signals add coherently at the receiver antenna. Under individual relay power constraints, Schein also indicates that amplification factors can be selected to maximize receiver SNR, though does not derive the explicit expression for the amplification factors. One of the stations sends with its maximum power, whereas the other sends with some other but smaller power. The shortcoming of Schein's schemes is that it is; only an information theoretical analysis, limited to only two relay stations, derived in a real valued channel with gain one (hence neglecting fundamental and realistic propagation assumptions), lacks the means and mechanisms to make the method practically feasible. For example, protocols, power control and RRM mechanisms, complexity and overhead issues are not addressed at all. With respect to only addressing only two relay stations, the significantly higher antenna gains and diversity benefits, as would result for larger number of relays, are neither considered not exploited.

The concept of multiple-access Channel with Relaying (a.k.a. as Multiple access channels with generalized feedback) has been investigated by several researchers lately and is schematically illustrated in FIG. 1c. The concept involves that two users cooperate, i.e. exchange the information each wants to transmit, and subsequently each user sends not just its own information but also the other users information to one receiver. The benefit in doing so is that corporation provides diversity gain. There are essentially two schemes that have been investigated; cooperative diversity and coded cooperative diversity. Studies are reported in [1], foe example. With respect to diversity, various forms has been suggested, such as Alamouti diversity, receiver diversity, coherent combining based diversity. Typically the investigated schemes and topologies rely on decoding data prior to transmission. This further means that stations has to be closely located to cooperate, and therefore exclude cooperation with more distant relays, as well as the large number of potential relays if a large scale group could be formed. An additional shortcoming of those schemes is that is fairly unlikely having closely located and concurrently transmitting stations. These shortcomings indicates that the investigated topology are of less practical interest. The broadcast channel with relaying, illustrated in FIG. 1d, is essentially the reverse of the topology depicted in FIG. 1c, and therefore shares the same severe shortcomings.

A further extension of the topology depicted in FIG. 1c, wherein two receivers are considered. This has e.g. been studied in [8] and [1] but without cooperation between the receivers, and hence not exploiting the possibilities possibly afforded by cooperative relaying.

Another reported topology, schematically illustrated in FIG. 1f, is sometimes referred to as Virtual Antenna Array Channel, and described in for example [9]. In this concept, (significant) bandwidth expansion between a communicating station and adjacent relay nodes is assumed, and hence non-interfering signals can be transferred over orthogonal resources that allows for phase and amplitude information to be retained. With this architecture, MIMO (Multiple Input Multiple Output) communication (but also other space-time coding methods) is enabled with a single antenna receiver. The topology may equivalently be used for transmission. A general assumption is that relay stations are close to the receiver (or transmitter). This limits the probability to find a relay as well as the total number of possible relays that may be used. A significant practical limitation is that very large bandwidth expansion is needed to relay signals over non-interfering channels to the receiver for processing.

Cooperative relaying has some superficial similarities to the Transmit diversity concept in (a.k.a. Transmit diversity with Rich Feedback, TDRF), as depicted in [10] and is schematically illustrated in FIG. 1g. Essential to the concept is that a transmitter with fixed located antennas, e.g. at a basestation in a cellular system, finds out the channel parameters (allowing for fading effects and random phase) from each antenna element to the receiver antenna and uses this information to ensure that a (noise free) signal, after weighting and phase adjustment in the transmitter, is sent and adds coherently at the receiver antenna thereby maximizing the signal to noise ratio. While transmit diversity, with perfectly known channel and implemented in a fixed basestation, provides significant performance benefits, it also exist practical limitations in terms of the number of antenna elements that can be implemented in one device or at one antenna site. Hence, there is a limit in the degree of performance gain that can be obtained. A disadvantage for basestation oriented transmit diversity is also that large objects between transmitter and receiver incur high path loss.

A significant shortcoming of the above discussed prior art is that they only enable and exploits a few, typically only two, stations to cooperate. The, in the art, proposed topologies and methods do not take full advantage of the anticipated advantages of a network with cooperative relaying that comprises a larger number of relaying stations. In particular, the proposed topologies and methods do not provide the necessary means to scale up the networks. One problem is that the control overhead between involved stations may become a large problem when many nodes are involved. In the worst case, more protocol overhead is sent than data traffic. A further problem is that the algorithms and processing means are not designed to manage large number of relay nodes, or increasing number of relay nodes i.e. the scaling issues in large cooperative relay networks has not been properly addressed.

BRIEF SUMMARY

An improved method, topology and system for a cooperative relaying network is needed, which can be scaled up to accommodate realistic traffic scenarios and which take full advantage of the anticipated advantages of a network with cooperative relaying that comprises a larger number of relaying stations.

A method, system and apparatus are provided that overcome the drawbacks of the prior art techniques.

The problem is solved by a distribution of functionality between relay stations, a transmitter (e.g. basestation/mobile station), and a receiver (e.g. mobile station/basestation).

In the method of performing communication in a wireless communication network using cooperative relaying according to an example embodiment, a transmitter, a receiver and at least one relay station are engaged in a communication session. The at least one relay station forwards signals from the first link between the transmitter and the relay station to the second link between the relay stations and the receiver. The relay station forwards the signal with the use of a relative transmission parameter and optionally a common transmission parameter, The relative transmission parameter is determined locally in each relay station and based on a characterization of the first link, or the second link or a combination of the first and second link. and the common transmission parameter is determined centralized and distributed to each relay station. Preferably, the common transmission parameter is determined centralized, for example in the receiver and distributed to each relay station. Alternatively the common transmission parameter is a priori known to the relay station, for example a fixed parameter set on installation or a parameter updated at some kind of maintenance procedure.

The method may be used phase control, power control or relay activation or any combination of phase control, power control, and relay activation.

The system adapted for communication in a wireless communication network using cooperative relaying comprises a transmitter, a receiver and at least one relay station, wherein the relay station is adapted to forward signals from a first link between the transmitter and the relay station to a second link between the relay stations and the receiver. The system has a logical architecture wherein:
  each relay station has means for performing channel characterization and means for adapting the forwarding based on a relative transmission parameter and a common transmission parameter;
  the receiver have means for determining a common transmission parameter and means for broadcasting the common transmission parameter to the relay stations; and
  the logical architecture comprises a first control loop between the receiver and the relay stations adapted to feedback the common parameter from receiver to the relay stations.

The system may further comprise a second control loop between the receiver and the transmitter adapted to feedback the transmission parameters from receiver to the transmitter.

Thanks to the present technology it is possible to scale up (compared to the prior art topologies) the network to involve a plurality of relay stations in a communication session between a transmitter and a receiver (such as a basestation and a mobile station or vice versa).

One advantage afforded by the present technology is that the amount of protocol overhead that is needed for the transmission of data from the transmitter to the receiver does not increase, at least not significantly, with increasing number of relay stations.

A further advantage is that the distribution of functionality makes it possible to take full advantage of the anticipated advantages of a network with cooperative relaying that comprises a larger number of relaying stations. With the technology used in a coherent combining setting, the directivity gain and diversity gain increases with increasing number of relay stations. The directivity gain itself offers increased SNR that can be used for range extension and/or data rate enhancement. The diversity gain, increases the robustness of the communication, providing a more uniform communication quality over time. While directivity and diversity gain can be provided by various traditional advanced antenna solutions, where the antennas are placed either at the transmitter or the receiver, the proposed solution is generally not limited to the physical space constraints as is seen in basestations or mobile terminals. Hence, there is indeed a potential to use a larger number of relays, than the number of antennas at a basestation or a mobile station, and hence offer even greater directivity and diversity gains.

Yet a further advantage is that as the technology makes it possible to use a multihop technique certain inherent advantages the technique can be taken advantage of, for example the ability to "go around" obscuring objects. For instance, diffraction loss for a path taken over a building down to the ground in cellular systems is often of order 30 dB. With one or more relays at appropriate positions, such high path losses may be mitigated entirely.

BRIEF DESCRIPTION OF THE DRAWINGS

The features and advantages of the present invention outlined above are described more fully below in the detailed description with the drawings where like reference numerals refer to like elements throughout, in which.

DETAILED DESCRIPTION

Figure 2:
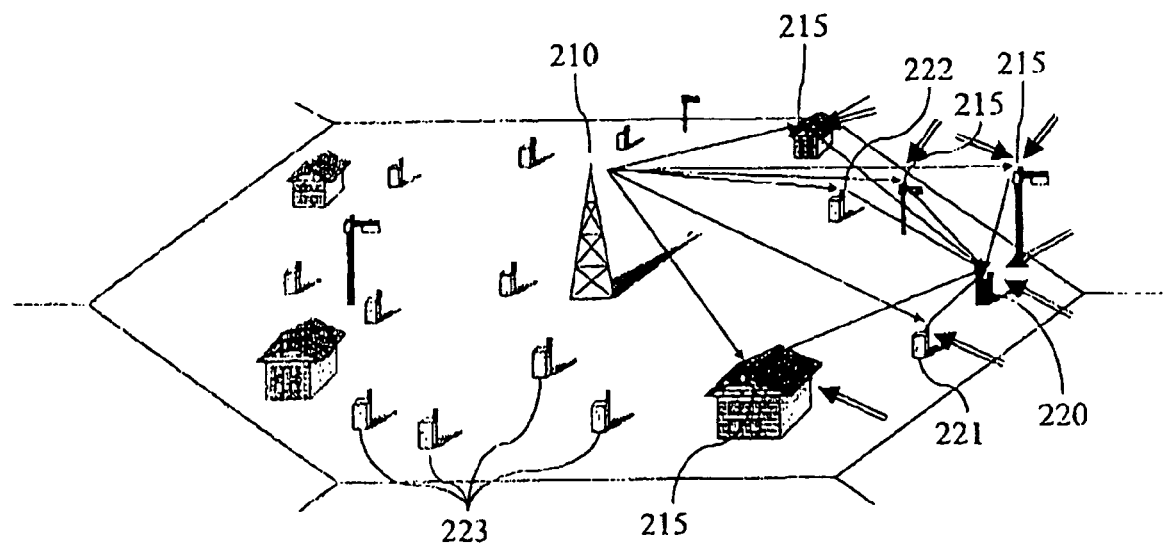
FIG. 2. schematically illustrates a cellular system using cooperative relaying according to an example embodiment.

The wireless network architecture, or topology, according to an example embodiment is illustrated in FIG. 2. The figure shows one cell 205 of the wireless network comprising a basestation 210 (BS), a plurality of relay stations 215 (RS) and a plurality of mobile stations (MS) 220-223. As shown in the figure, the relay stations 215 are mounted on masts, but may also be mounted on buildings, for example. Fixed relays may be used as line of sight conditions can be arranged, directional antennas towards the basestation may be used in order to improve SNR (Signal-to-Noise Ratio) or interference suppression and the fixed relay may not be severely limited in transmit power as the electricity supply network typically may be utilized. However, mobile relays, such as users mobile terminals, may also be used, either as a complement to fixed relays or independently. The mobile stations 221 and 222 are examples of mobile relays, i.e. mobile stations that temporarily functions also as relays. The mobile station 220 is in active communication with the base station 210. The signalling, as indicated with arrows, is essentially simultaneously using a plurality of paths, characterized by two hops, i.e. via a relay station 215 or a mobile station acting as a mobile relay 221, 222. The transmission will experience interference from for example adjacent cells, and the effect of the interference will vary over the different paths.

It should be noted that although relay based communication is used to enhance communication, direct BS and MS communication may still be used. In fact, some basic low rate signalling between BS and MS may be required for setting up a relay supported communication channel. For example, a cellular system function such as paging may not use coherent combining based relaying as the relay to MS channels are not a priori known, instead preferably, a direct BS to MS communication is used during call setup and similar procedures.

The network outlined in FIG. 2 can be seen as a development of the "parallel relaying" previously discussed. The necessary means and methods according to the ex embodiment, needed to scale up the previously reported theoretical ideas into a realistic wireless network will be further described below.

Figure 3:
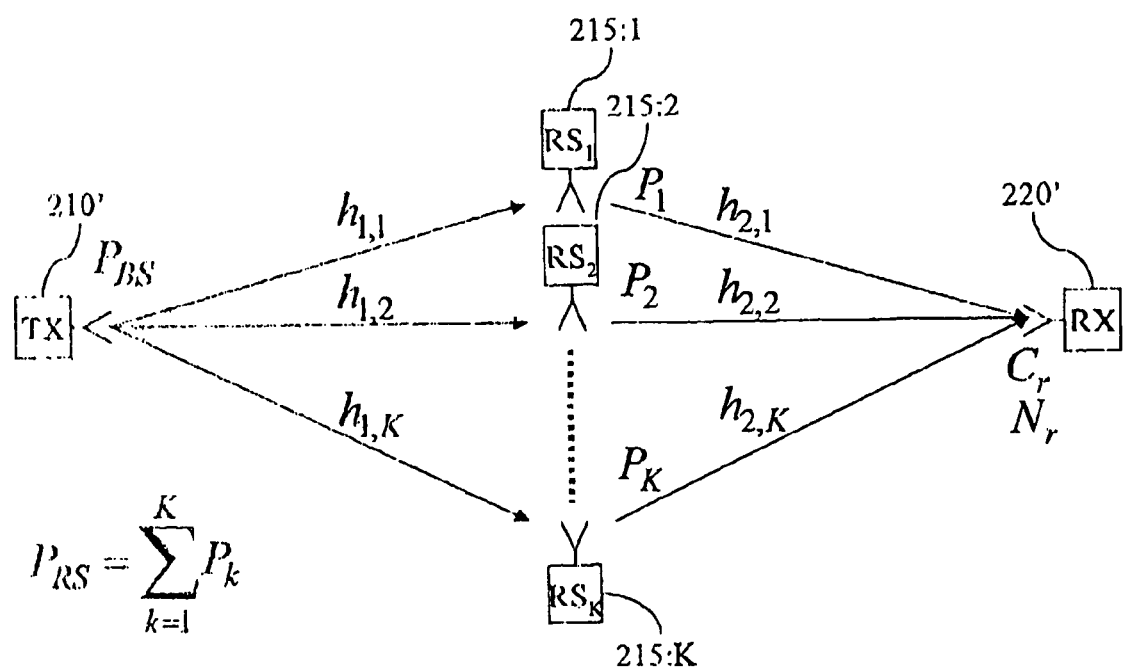
FIG. 3 is a schematic model used to describe the parameters and terms used in an example embodiment.

The real world cellular system outlined in FIG. 2 is modeled by system model shown in FIG. 3, here with focus on a single pair of transmitter and receiver, with an arbitrary number K of relay stations. The notation is adapted to a basestation 210 as a transmitter 210' and a mobile station 220 as a receiver 220', but not limited thereto, e.g. in another scenario, the transmitter and receiver could be the mobile station and the basestation respectively. The communication between the transmitter 210' and the receiver 220' can be described as comprising to main parts the transmissions from the transmitter 210' to the relay stations 215:k referred to as link 1, and the transmissions from the relay stations 215:k to the receiver 220' referred to as link 2.

The transmitter 220' (BS 220) transmits with a power $P_{BS}$. Each relay station 215:k, wherein k∈{1, 2, ..., K} and K is the total number of relay stations, receive the signal and re-transmits with a total power $P_k$. The aggregate transmit power of all relay stations 215:k is denoted $P_{RS}$. $h_{1,k}$ is the complex path gain from the basestation 210 to relay station k 215:k, and $h_{2,k}$ is the complex path gain from the relay station k to the mobile station referred to as, i.e. $h_{1,k}$ and $h_{2,k}$ characterizes the individual signal paths. The receiver 220' (MS 220) receives a total signal denoted $C_r$ and experience the total noise $N_r$.

Typically, in a realistic scenario a BS in a cell is simultaneously engaged in communication with a plurality of mobile stations. This can be envisaged by considering each communication as modeled in accordance to FIG. 3. For clarity only a communication session involving one BS, one MS and a plurality of a relay station will be considered in the present application. However, as well be apparent for the skilled in the art the inventive architecture and method/scheme is easily applied also in the case with a plurality of simultaneous communications between the base station and mobile stations.

As realized by the skilled in the art, in a network according to the above model, a large number of parameters need to be set and preferably optimized in order to fully take advantage of the possibilities and capacity offered by such a network. This is also, as previously discussed, where the prior art systems display their shortcomings as multi-relay systems, due to their presumed complexity, are not discussed. Parameter that needs to be considered and preferably optimize include, but is not limited to, transmit power of the basestation 210 and each relay station 215:k, which relay stations that should be used in the communication, and, if coherent combining is to be used, phase control. The parameters needed to control and optimize the transmission will be referred to as transmission parameters (TP). The preferred optimization includes, but is not limited to, optimizing the transmit powers of the base station 210 and the relay stations 215:k in order to obtain a specific SNR at the receiving mobile station, which in turn correspond to a certain quality of service or capacity, for example, with regards to power consumption of the different entities and the interference level in the cell and adjacent cells, for example.

In the architecture and the method according to the present technology the complexity of a network using parallel relaying with a plurality of relay station is handled by a distribution of functions relating to the estimating of radio channels and the determining and optimizing of the transmission parameters.

In the method of performing communication in a wireless communication network using cooperative relaying according to the present technology, the transmitter 210', the receiver 220' and at least one relay station 215 are engaged in a communication session. The at least one relay station 215 forwards signals from the first link between the transmitter 210' and the relay station 215 to the second link between the relay stations 215 and the receiver 220'. The relay station 215 forwards the signal with the use of a relative transmission parameter and optionally a common transmission parameter. The relative transmission parameter is determined locally in each relay station 215 and based on a characterization of the first link, or the second link or a combination of the first and second link. Preferably, the common transmission parameter is determined centralized, for example in the receiver 220' and distributed to each relay station 215. Alternatively the common transmission parameter is a priori known to the relay station, for example a fixed parameter set on installation or a parameter updated at some kind of maintenance procedure.

The method according to an example embodiment will be described with reference to the flowchart of FIG. 4 and the logical architecture illustrated in FIG. 5. The method of determining and possibly optimizing the transmission parameters comprises the main acts or steps of:

400: Send pilots on the k paths of link 1;
410: Characterize the k radio paths of link 1 based on the received pilots send on link 1;
420: Send pilots on the k paths of link 2;
430: Characterize the k radio paths of link 2 based on the received pilots send on link 2;
440: Determine k relative transmission parameters, one for each relay station, wherein the relative parameters is based on one, or both, of the characterizations of the radio paths of the link 1 and link 2, respectively. Alternatively, if more than one type of transmission parameters are under simultaneous consideration, k sets of relative transmission parameters, one set for each relay station is determined, wherein at least one parameter in a set is based on one, or both, of the characterizations of the radio paths of the link 1 and 2, respectively.
450: Optionally determine a common parameters, or set of common transmission parameters.
470: Use the relative transmission parameter and optionally the common transmission parameters for the transmissions on link 2. Alternatively; use the relative parameter in each set of relative transmission parameters and optionally corresponding common parameter of the set of common parameters for the transmissions on link 2.

"Pilots" and "sending pilots" should be interpreted as sending any kind of channel estimation symbols. "Hello messages" may also be used for this purpose.

It should be noted that the sending of pilots does not have to occur in the above order and may also be simultaneous on link 1 and 2.

As there are two links, transmitter to relay (first link) and relay to receiver (second link), four possibilities of which station(s) transmit and which station(s) estimate the channel (s) exists. The four possibilities are summarized in Table 1. The purpose is to illustrate that several different implementation approaches of the technology may be taken.

TABLE 1

| | Link 1 | | Link 2 | |
|---|---|---|---|---|
| Case | Transmitter | Relay | Relay | Receiver |
| 1 | Send pilot | Estimate ch. | Estimate ch. | Send pilot |
| 2 | Send pilot | Estimate ch. | Send pilot | Estimate ch. |
| 3 | Estimate ch. | Send pilot | Estimate ch. | Send pilot |
| 4 | Estimate ch. | Send pilot | Send pilot | Estimate ch. |

Given that channel characterization has been performed in some station, it is also issue who perform processing of the collated information, i.e. determine the relative transmission parameters. Essentially, there are three choices, the transmitter 210', the receiver 220' or a set of relay stations RS 215. Since it is the relay stations that must perform the adjustments of the transmissions on link 2, this is the preferred place to determine the relative transmission parameters. If a relay station sends a pilot signal, a representation of the channel characterization needs to be reported back to the relay. If a relay station instead receives a pilot, the representation of the channel characterization does not need to be reported anywhere (corresponding to case 1). Case one in many situations the preferred alternative, since it minimizes the overhead signaling. However, many possibilities exist and the invention is not limited hereto.

Thus, the relative transmission parameters are preferably determined at each relay station in a fully distributed manner. However, each relative transmission parameters may need to be adjusted with the common transmission parameter (step 460). A preferred location where the common transmission parameter can be determined as well as distributed from, as will be further discussed, is the receiver 220' (MS 220). This, the logical architecture according to the technology, is schematically illustrated in FIG. 5. Each relay station 215:k has means for performing channel characterization 216 and means for determining relative transmission parameters 217 based on the channel characterization (steps 410, 430 and 440) and means for using 218 the relative transmission parameters and common transmission parameter(s) in forwarding on the second link. The receiver 220' has means for performing an estimate of the total communication quality 221 and means for determining a common transmission parameter 222. The common transmission parameter is distributed from the receiver 220' to the relay stations 215:k preferably as a direct broadcast to the relay stations 215:k or alternatively via the transmitter 210', for example. The relay stations 215:k receive the common transmission parameter and in combination with their relative transmission parameters adapt their forwarding of the signal of link 1 (step 460) on link 2. Logically this can be described as a control loop between the receiver 220' and the relay stations 215:k. Typically another control loop exists between the receiver 220' and the transmitter 210', regulating the transmitter's transmission parameters such as output power, modulation mode etc. Hence, a preferred embodiment of the present invention comprises two logical control loops: a first control loop 505 between the receiver 220' and the relay stations 215:k, providing the relay stations with the common transmission parameter, and a second control loop 510 feedbacking transmission information from the receiver 220' to the transmitter 210'.

Figure 6:
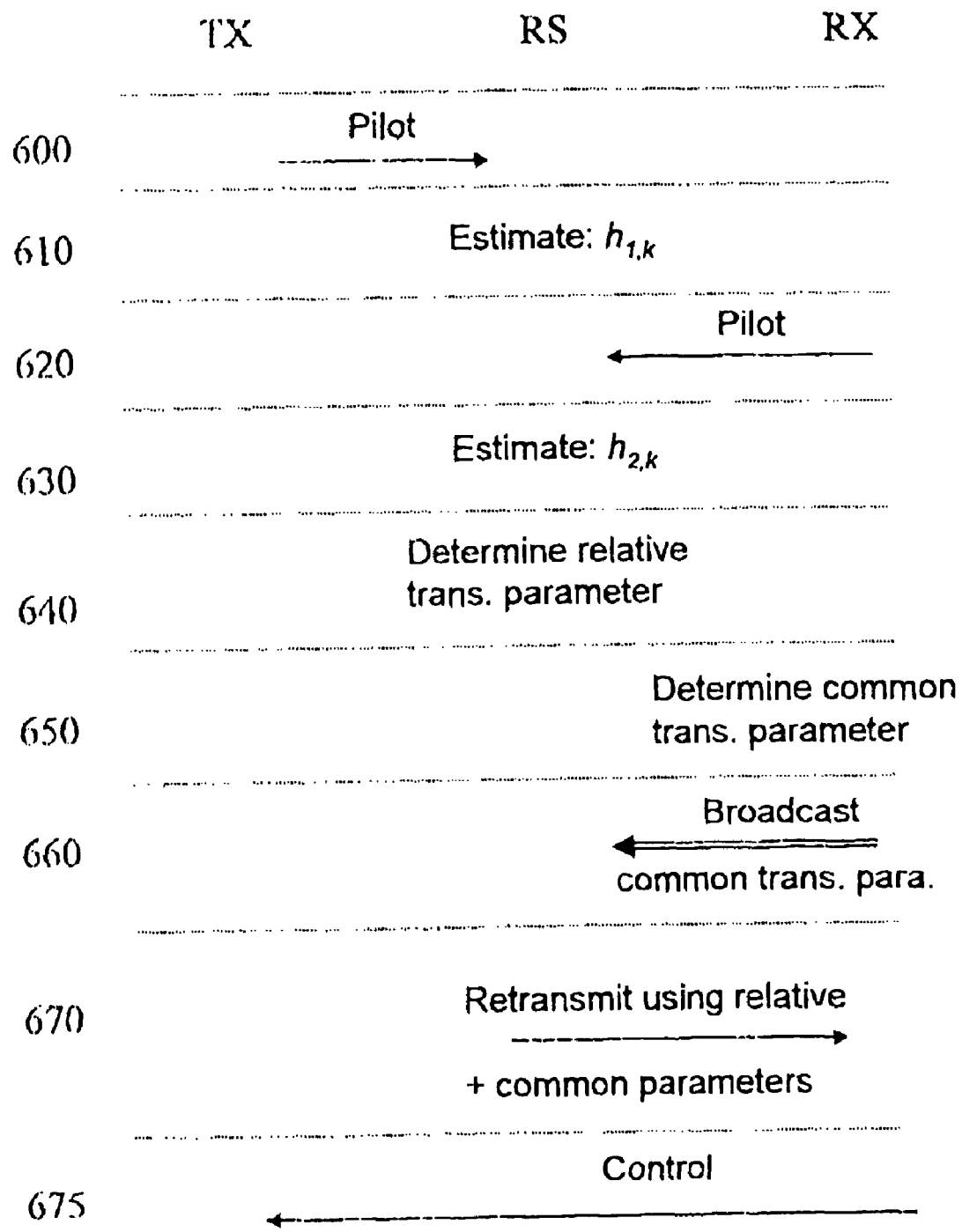
FIG. 6 is a signaling scheme over one example embodiment.

Given the above considerations a preferred embodiment illustrated by the signalling scheme of FIG. 6, may comprise the acts or steps of:

600: Send pilots on the k path of link 1, from transmitter 210' to relay stations 215:k;
610: Each relay station 215:k estimates the k channel of link 1, $h_{1,k}$;
620: Send pilots on the k path of link 2, from receiver 220' to relay stations 215:k;
630: Each relay station 215:k estimates the k channel of 2, $h_{2,k}$;
640: Each relay station 215:k determine one or a set of relative transmission parameters, wherein the relative parameter is based on one, or both, of the channel estimates $h_{1,k}$, $h_{2,k}$ characterizing each path.
650: The receiver 220' determines a common transmission parameter, or a set of common transmission parameter, based on the total communication quality experienced by the receiver, for example. The determination is typically based on measures of a previous transmission. If such does not exist, i.e. in an initial transmission of a communication session, default initial values of the common transmission parameters may be used, or alternatively the determination of the common transmission parameters is based on other information, for example positioning information.
660: The receiver 220' broadcasts the common transmission parameter(s) to the relay stations 215:k;
670: Each relay station 215:k uses its relative transmission parameter and the common transmission parameter(s) to adjust the subsequent transmission on link 2.
675: The receiver 220' feedbacks control information to the transmitter 210'.

The steps 600-675 are performed at least once for each session, and preferably more frequent, in other to adjust to a varying channel. The steps 600-675 may be performed in a rate up to once in each frame of the session between the base station 210 and the mobile station 220.

The power used in any initial transmission from the relay stations 215 to the receiver 220', for example an initial transmission of pilots in step 620, should preferably be limited, for example to a power that would give a specific SNR at the receiver corresponding to if only the relay stations were transmitting.

The communication quality used by the receiver 220' (step 650) to determine the common transmission parameters may for example be measures on signal, noise, bit error rate and packer error rate.

The use of the channel estimates $h_{1,k}$, $h_{2,k}$ characterizing each path, to determine the relative transmission parameters, is a preferred choice in the case of coherent combining.

Alternatively may, if more appropriate with regards to the employed transmission/diversity technique such as Almouti diversity, other characterization of the first and second link be used, for example path gain.

The steps 650-670 relating to the common transmission parameter corresponds to the first control loop, and the step 675 to the second control loop. The needs for updates of the transmission parameters will depend on factors relating to the movement of the mobile station 220 and the rate of changes in the radio environment, but also on the chosen transmission technique. For example, coherent combining typically requires frequent complex channel updates due to the rapid changes in the relative phase. Methods for providing rapid and reliable control mechanism are known in the art, for example the power control in existing wireless systems such as WCDMA, for example.

As can be understood be studying the above described example embodiments the amount protocol overhead that is needed for the transmission of data from the transmitter to the receiver does not increase, at least not significantly, with increasing number of relay stations. The distribution of functionality and the efficient control loops make it possible to scale up the cooperative relay network so that they can be used in a realistic scenario.

The distribution of functionality makes it possible to take full advantage of the anticipated advantages of a network with cooperative relaying that comprises a larger number of relaying stations. With the technology used in a coherent combining setting, the directivity gain and diversity gain increases with increasing number of relay stations. The directivity gain itself offers increased SNR that can be used for range extension and/or data rate enhancement. The diversity gain, increases the robustness of the communication, providing a more uniform communication quality over time. While directivity and diversity gain can be provided by various traditional advanced antenna solutions, where the antennas are placed either at the transmitter or the receiver, the proposed solution is generally not limited to the physical space constraints as is seen in basestations or mobile terminals. Hence, there is indeed a potential to use a larger number of relays, than the number of antennas at a basestation or a mobile station, and hence offer even greater directivity and diversity gains.

An inherent advantage of multihop techniques, made possible to utilize by the present technology, is the ability to "go around" obscuring objects. For instance, diffraction loss for a path taken over a building down to the ground in cellular systems is often of order 30 dB.

Described below are different embodiments of the method and architecture of the present technology adapted for the control and optimization of transmitted power, phase and relay station activation.

In order to implement the distribution of functionality between the relay stations, the base station and the mobile stations described above, a model is needed for the interaction of the relative transmission parameters and the common transmission parameter. An analytic approach is outlined below and the full analysis is given in the section "detailed derivation". Each relay station k transmits with a total power defined by $$P_k = \frac{P_{RS} \cdot |a_k|^2}{\sum_{k=1}^{K} |a_k|^2} \quad (1)$$

where $P_{RS}$ is the aggregate transmit power of all relay stations, $\alpha_k$ is a un-normalized complex gain factor for relay station $k \in \{1, 2, \ldots, K\}$ and K is the total number of relay stations.

In "detailed derivation" it is shown that the maximum receiver SNR is attained (provided the received signal including noise is normalized to unit power in each relay) if $$|a_k| = \frac{\sqrt{\Gamma_{RS,k}} \cdot \sqrt{\Gamma_{MS,k}} \cdot \sqrt{\Gamma_{RS,k} + 1}}{\Gamma_{RS,k} + \Gamma_{MS,k} + 1} \quad (2)$$

, and if $$\arg\{\alpha_k\} = -\arg\{h_{1,k}\} - \arg\{h_{2,k}\} \quad (3)$$

where $$\Gamma_{RS,k} = \frac{|h_{1,k}|^2 P_{BS}}{\sigma_{RS,k}^2}$$

, and $$\Gamma_{MS,k} = \frac{|h_{2,k}|^2 P_{RS}}{\sigma_{MS}^2}$$

, and $P_{BS}$ is the transmit power of the basestation, $\sigma_{RS,k}^2$ is the noise plus interference level at any relay station, $\sigma_{MS}^2$ is the noise plus interference level at the mobile station, $h_{1,k}$ is complex path from the basestation to the relay station k, and finally $h_{2,k}$ is complex path gain from the relay station k to the mobile station.

Bringing the expression above together, it can be shown (see the detailed derivation) that a relay station k that receives a signal $y_k$ (including noise) shall transmit the following signal $$z_k = y_k \cdot \frac{1}{\sqrt{\sum_{k=1}^{K} |a_k|^2}} \cdot \frac{\sqrt{P_{RS} \cdot \Gamma_{RS,k} \cdot \Gamma_{MS,k}}}{\sigma_{RS,k} \cdot (\Gamma_{RS,k} + \Gamma_{MS,k} + 1)} \cdot e^{-j(\arg(h_{1,k}) + \arg(h_{2,k}))} \quad (4)$$

The $\Sigma |\alpha_k|^2$ term acts as a power normalization factor, which may be denoted $\phi$, and it is observed that it cannot be determined individually by each relay. Instead it is hinted here that $\phi$ must be determined at some other suitable station and distributed to the relays. $1/\phi$ corresponds to the common transmission parameter, and $$\frac{\sqrt{P_{RS} \cdot \Gamma_{RS,k} \cdot \Gamma_{MS,k}}}{\sigma_{RS,k} \cdot (\Gamma_{RS,k} + \Gamma_{MS,k} + 1)} \cdot e^{-j(\arg(h_{1,k}) + \arg(h_{2,k}))}$$

to the relative transmission parameter for relay station k. The maximum attainable receiver SNR under aggregate relay transit power constraint can be determined to $$\Gamma_{Eff}^{(max)} = \sum_{k=1}^{E} \frac{\Gamma_{RS,k} \cdot \Gamma_{MS,k}}{\Gamma_{RS,k} + \Gamma_{MS,k} + 1} \quad (5)$$

At closer inspection, it is noted that the SNR contribution from each individual relay to $\Gamma_{eff}^{(max)}$ is equivalent to that if each relay station would transmit with all relay transmit power $P_{RS}$ themselves.

Moreover, "derivation of analytic expressions", expressions for a combination of regenerative and non-regenerative coherent combining is also presented. When studying regenerative and non-regenerative coherent combining an interesting observation is that a regenerative approach is generally inferior to non-regenerative case, because regenerative relaying by necessity is constrained to a region around the transmitter and cannot exploit all available relays in an optimal manner. With other words, even though a signal may not be decoded, it may still contribute when coherent combining is employed. In any case, a combination of non-regenerative and regenerative scheme will perform slightly better than if only the non-regenerative method is considered. The mechanisms for power and phase control that are discussed in the following are independent and generic to whether regenerative relaying is employed as well.

Phase Control

As the first implementation example the logical architecture and the method according to an example embodiment is adapted for the use of facilitating coherent combining. A prerequisite for coherent combining is that signals are phase-aligned at the receiver. This is enabled by compensating for the complex phase from the transmitter 210' to the relay station 215 as well as the complex phase form the relay station 215 to the receiver 220'. Practically, in each relay station the received signal, $y_k$, is multiplied with the phase factor $e^{-j \cdot \arg(a^k)}$ where $$\arg\{\alpha_k\} = -\arg\{h_{1,k}\} - \arg\{h_{2,k}\}.$$

Therefore, explicit or implicit channel phase information must be made available at each individual relay station. There are essential two basic schemes that can be used in deriving phase information, one based on closed loop control and one on open loop control. The closed loop control is necessary to use when channel reciprocity cannot be exploited, such as in FDD (used over a single link), or when high control accuracy is required. The open loop control scheme instead exploits channel reciprocity, e.g. enabled by TDD (used over a single link) with channel sounding that operates within channel coherence time. Open loop control is generally less accurate than closed loop control, due to asymmetries in the transmit/receive chains for a station. The differences boils down to the effort put into hardware design, and can always be compensated by improved design. Also, incorporating occasional closed loop control cycles may compensate for static open loop errors. However, in the example embodiment the phase error can in principle be up to ±90 degrees and still combine coherently (but not very efficiently) with other relayed signals. Hence, absolute phase accuracy is not a must, but certainly preferred. A closed control scheme generally relies on explicit signalling, reporting the result of measurements and therefore consumes more communication resources and incurs latency relative an open loop scheme. Note that this discussion on TDD vs. FDD considers duplexing technique over a single link at a time, e.g. the relay station to receiver link, whereas it is also possible to characterize the overall communication in the network on basis of time and frequency division. For example, link one and link two may share a frequency band or use different ones. From point of view of the technology, however, any combination of duplexing and multiple access schemes may be used, as long as channel phase information can be determined and used for phase compensation in the relay stations.

Tightly connected with closed loop and open loop control is the issue which station sends the pilots, which has been discussed previously in reference to table 1. Since it is relay stations that must perform phase adjustment, this is the natural place to determine $\arg\{\alpha_k\}$. If a relay station sends a pilot signal, the phase (or channel) parameters need to be reported back to the relay. This corresponds to the closed loop case. If a relay station instead receives a pilot, the phase (or channel) parameter does not need to be reported anywhere. This corresponds to the open loop case. It is clear that depending whether phase (i.e. channel) information need to be sent away in a control packet or can be kept in the same station, this has an impact on radio resource efficiency, power consumption as well implementation complexity. In any case, as seen from above, a myriad of possibilities exist and we select the most promising. A preferred combination of duplexing and multiple access will be further discussed. However, as appreciated by the skilled in the art a very large number of possibilities exist and the invention is not limited to the below exemplified.

Case 1 (see table 1), which is of open loop type and suitable for TDD with "sufficient" coherence time, offers the lowest signalling complexity as only two transmissions are necessary and the processing is distributed on all relay stations. Here, the transmitter as well as the intended receiver issue channel estimation symbols often enough or whenever needed such that each relay car track both (complex) channels. The relay station subsequently estimates the channel phases that determine the phase factor of $\alpha_k$.

Power Control

A second important aspect for resource efficient communication, apart from phase control, is power control, since it provides means to ensure satisfactory communication quality. The logical architecture and the method according to an example embodiment is readily adapted to be used for an effective power control. The power control method is based on that the effective SNR at the receiver is controlled towards a target SNR, $\Gamma_0$, which assert the desired link quality. The target SNR may of course change with time depending on how link mode or QoS requirement changes with time. According to the logical architecture and the method according to an example embodiment power may be adjusted at the transmitter and individually at each relay. The relay power control has common as well as individual relay component. In the objective of minimizing the aggregate power addresses the issue of multiple access interference minimizations as well as minimizing relay power consumption. However, when a MS act as a transmitter, the power control may also be use as a method for significantly minimizing power consumption and radiated power for the MS, which among other advantages prolongs the battery life of the MS.

On the highest level, the power control problem may be defined as:

Find $\{P_{RS}, P_k\}, \forall k \in \{1, 2, \ldots, K\}$; such that $\Gamma_{\mathit{eff}}^{(max)} = \Gamma_0$ This is preferably accomplished under some constraints, such as minimization of $P_{RS} = \Sigma P_k$ and with fixed $P_{BS}$, but other constraints may also be considered, e.g. minimization of the total transmit power $P_{RS} + P_{BS}$ or by taking localization of relay induced interference generation into account. In the following, we assume minimization of $P_{RS} = \Sigma P_k$ with fixed (or relatively slow) adaptation of $P_{BS}$. This is a reasonable design objective in downlink, but for uplink it may be of greater interest to minimize the transmitter power. However, if the relays are mobile and relay on battery power, the sum power of relays and transmitter may be minimized.

This is the basic function of power control. From practical viewpoint, the overall task of controlling power in a cooperative relay network in general, and with coherent combining in particular, is to use previous knowledge of used power $P_{BS}$ and $P_k$ and update those parameters to meet desired communication quality.

Power control share much of its traits with the phase control as the gain of the links may be estimated in several ways, depending on closed/open loop, TDD/FDD, distribution of control aspects. Hence, also here can a range of alternative implementations be envisioned. In the following, similar to the phase control discussion, it is assumed that the transmitter and receiver issue channel estimation signals and that channel gain reciprocity can be assumed, but the invention is not limited hereto.

The power control being proposed here has both a distribution component for each relay station, the relative transmission parameter, and a component common to all relays, the common transmission parameter. The scheme operates as follows: Through channel estimation, and with knowledge of the power used to send the pilot, each relay station may determine its respective path gain towards the transmitter and receiver respectively, but also interference and noise levels may be estimated at the same time. Based on path gain measurement, and information about $P_{RS}$ and $\sigma_{MS}^2$, it is possible to determine $\Gamma_{MS,k}$. Possibly also based on path gain, noise with interference estimations and $P_{BS}$ awareness, or simply direct SNR measurements on any received signal, the SNR at the relay station, $\Gamma_{RS,k}$, can be determined. Based on this, the relative transmit power levels can be determined at each relay station in a fully distributed manner. However, each relative transmit power level need scaled with normalization factor $\phi$ to ensure that aggregate transmit power is identical, or at least close, to the aggregate transmit power $P_{RS}$. This is the common power control part. If $\phi$ is too small, then more power than optimum $P_{RS}$ is sent, and hence a more optimal relative power allocation exist for the invested transmit power. The same is valid when $\phi$ is too large. Hence, it is important for optimal resource investment to control $\phi$ such that the intended power $P_{RS}$ is the aggregate transmit power level by the relays. N.B., it is not a significant problem from performance point of view if $\phi$ is somewhat to small as that only improves the effective SNR, since the relative impact of receiver internal noise is reduced.

Figure 5:
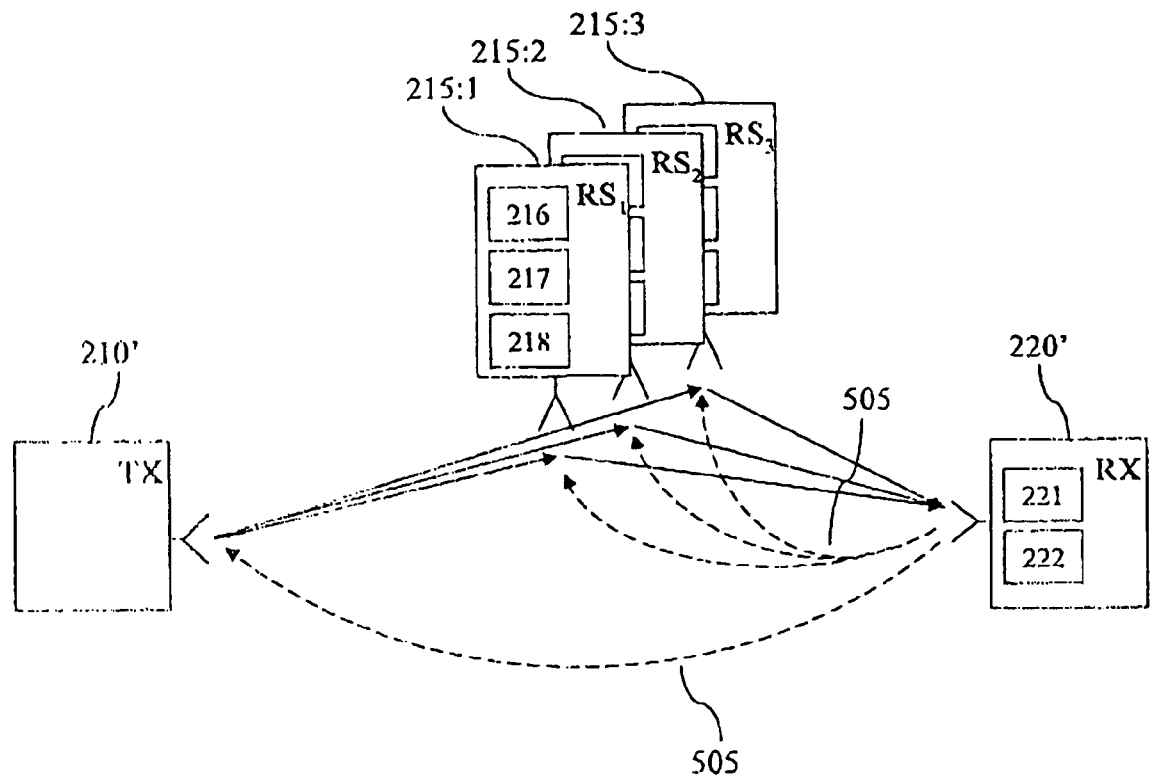
FIG. 5 is a schematic illustration of the logical architecture for the cooperative relaying network according to an example embodiment.

Referring now to the logical architecture illustrated in FIG. 5 the normalization factor, being a common transmission parameter, is preferably determined, as well as distributed from, the receiver. This should be seen as a logical architecture, since it is also possible to forward all control information to the transmitter, which then redistribute it to the relay stations, for example. The first control loop 505 between the receiver 220' and the relay stations 215:k, provides the relay stations with the $P_{RS}$, whereas the second control loop 510 from the receiver 220' to the transmitter 210', provides the transmitter with $P_{BS}$. Optionally, if the transmitter has a better view of the whole radio system including many groups of cooperative TX-RS-RX links, similar to what a backbone connected basestation in a cellular system would have, than it may incorporate additional aspects that strive to optimize the whole system.

One method to implement the control loop at the receiver is now given, then assuming that $P_{BS}$ is fixed (or controlled slowly). From a transmission, occurring at time denoted by n, the receiver measure the power of the coherently combined signal of interest, $C_r$, the relay induced noise measured at the receiver, $N_r$, and the internal noise in the receiver $N_i$. Based on this, and conditioned $\Gamma_0$, the receiver determines $P_{RS}^{(n+1)}$ and an update of normalization factor, $\phi^{(n+1)}$. This can be written as a mapping through an objective function $f$ as $$f(C_r, N_r, N_i) \to \{P_{RS}^{(n+1)}, \phi^{(n+1)}\}; \text{ such that } \Gamma_{\mathit{eff}}^{(max)} = \Gamma_0 \qquad (6)$$

The receiver then distributed the updates, $P_{RS}^{(n+1)}$ and $\phi^{(n+1)}$, to all relays through a multicast control message. To illustrate the idea, assume that $P_{RS}$ is kept fixed from previous transmission, but the normalization factor is to be adapted. In the section "detailed derivation" it is shown that optimum normalization requires a balance between receiver signal, $C_r$, and the total receiver noise, interference and receiver internal noise $N_r + N_i$ according to $$C_r = (N_r + N_i)^2 \qquad (7)$$

Hence, including previous normalization factor $\phi^{(n)}$, which is known by the receiver, and the update needed $\phi^{(n+1)}$ to balance the equation, the relation becomes $$C_r \frac{\varphi^{(n)}}{\varphi^{(n+1)}} = \left( N_r \frac{\varphi^{(n)}}{\varphi^{(n+1)}} + N_i \right)^2 \qquad (8)$$

which yields $\phi^{(n+1)}$ by solving a simple second order equation.

If both $P_{RS}$ and $\phi$ need to be updated, the balance equation above, the relation for the receiver SNR, $\Gamma$, can be used together with measured signal levels and solve for $P_{RS}$ and $\phi$. Linearization techniques, such as Taylor expansion and differentials, may preferably be used for this purpose and solving for $\Delta P_{RS}$ and $\Delta \phi$.

It is noted that for the first transmission, the normalization factor is not given a priori. Different strategies may be taken to quickly adapt the power. For instance, an upper transmit power limit may initially be determined by each relay as they can be made aware of $\Gamma_0$ and also can determine their (coherent combining) SNR contribution. If each relay stays well below this upper limit with some factor, power can be ramped up successively by the control loop so ongoing communications are not suddenly interfered with. This allows control loops, for other communication stations, to adapt to the new interference source in a distributed and controlled manner.

Also note that even though transmit power limitations occur in any relays, the power control loop ensures that SNR is maximized under all conditions.

Another, possibly more precise, method to determine the normalization factor is to determine the $|\alpha_k|$ term in each relay and then send it to the receiver where $\Sigma |\alpha_k|^2$, is calculated and hence yielding the normalization factor $\phi$. Subsequently $\phi$ is distributed to all relays, similar to previous embodiment. Note that the amount of signalling may be reduced and kept on an acceptable level by sampling only a subset of all relays, i.e. some of the most important relays, in order to produce a sufficient good estimate of $\Sigma |\alpha_k|$ term. This is further motivated that $\Sigma |\alpha_k|$ the term will generally not change much over short time, even in fading channels, due to large diversity gains inherent in the technology.

Although power control has been described in the context of coherent combining, the framework is also applicable for power control in other types of relay cooperation schemes, such as various relay induced transmit diversity, such as Alamouti diversity. The framework is similar in that the power control considers combinations of transmitter power, individual relay power and aggregate relay power. Another example of relay induced transmit diversity is (cyclic/linear) delay diversity. Each relay imposes a random or controlled linear (or cyclic) delay on the relayed signals, and hence causes artificial frequency selectivity. Delay diversity is a well known transmit diversity from CDMA and OFDM based communication.

To summarize this section, this technology suggests using power control as a concept to ensure performance optimization for coherent combining based cooperative relaying in a realistic channel and in particular to optimize signal to noise ratio under aggregate relay transmit power constraints. This power control concept is not limited to coherent combining based cooperative relaying networks, but also other cooperative relaying oriented networks may use the same concept, though then with optimization objectives most suitable to the scheme being used. In addition, the basic features for a protocol based on channel sounding and estimation of gain parameters over both link one and link two are suggested. A reasonable design choice for protocol design (with commonalities with the phase control) has also been outlined, based on low complexity, low signalling overhead and low total power consumption. In particular, it is shown that combination of power control loops including relay and transmitter power control may be used. Lastly, it has been demonstrated that the control loop for the relays may be build on distributed power control decisions in each relay as well as a common power control part, where the whole set of relays are jointly controlled.

Figure 7:
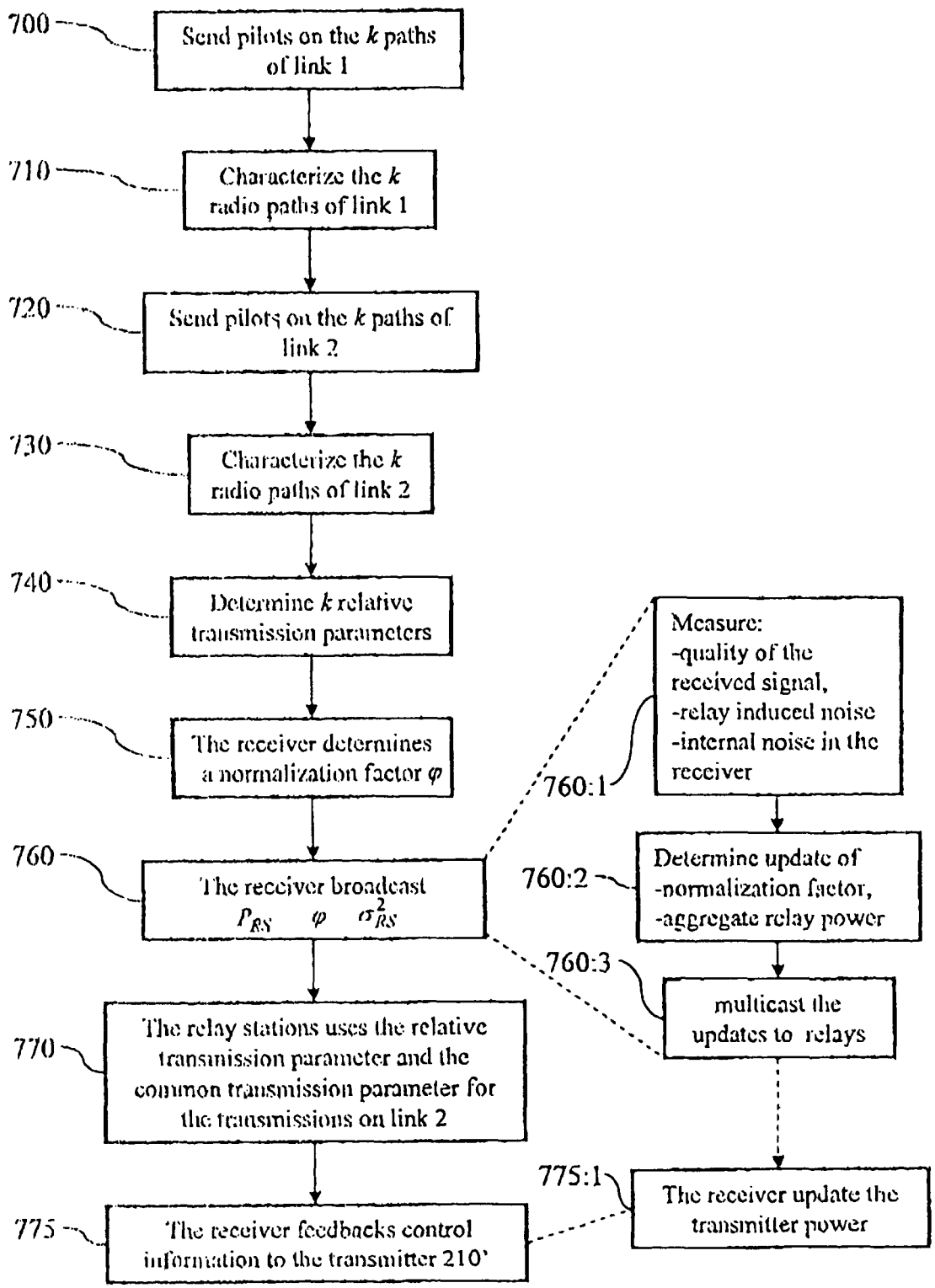
FIG. 7 is a flowchart over one example embodiment of the method.

The main steps of the embodiment using the method and architecture for a combined efficient power control and phase control is illustrated in the flowchart of FIG. 7. The method comprises the acts or steps of:

700: Send pilots on the k paths of link 1, from transmitter 210' to relay stations 215:k;

710: Each relay station 215:k estimates the k channel of link 1, $h_{1,k}$; Also interference and noise levels are estimated in order to calculate $\Gamma_{RS,k}$.

720: Send pilots on the k paths of link 2, from receiver 220' to relay stations 215:k;

730: Each relay station 215:k estimates its respective channel out of the k channel of 2, $h_{2,k}$;

740: Each relay station 215:k determines relative transmission parameters based on the channel estimates.

750: The receiver 220' determines the normalization factor $\phi$.

760: The receiver 220' broadcast the normalization factor $\phi$, $P_{RS}$, and $\sigma^2_{RS}$ to the relay stations 215:k.

770: Each relay station 215:k uses the broadcasted $\phi$, $P_{RS}$, and the locally determined $\Gamma_{MS,k}$ and $\Gamma_{RS,k}$, and the phase of channel estimates $h_{1,k}$, $h_{2,k}$ to, on the reception of signal $y_k$, transmit the following signal:

$$z_k = y_k \cdot \frac{1}{\varphi} \cdot \frac{\sqrt{P_{RS} \cdot \Gamma_{RS,k} \cdot \Gamma_{MS,k}}}{\sigma_{RS,k} \cdot (\Gamma_{RS,k} + \Gamma_{MS,k} + 1)} \cdot e^{-j(arg(h_{1,k}) + arg(h_{2,k}))}$$

wherein the parameters $\Gamma_{RS,k}$ is calculated based on the channel estimate, $P_{BS}$, and $\sigma^2_{RS}$, and $\Gamma_{MS,k}$ based on $P_{RS}$, and $\sigma_{MS}^2$.

If the first transmission to the receiver is considered, (then the power loop is unaware of the forthcoming; link quality), by way of example the relay may modify and upper limit the received normalization factor $\phi$ such that $\phi_k = c \cdot |\alpha_k|^2$, $c \leq 1$ being sent from the receiver or is a priori known.

775: The receiver 220' feedbacks control information to the transmitter 210' ($P_{BS}$).

The first control loop, indicated in step 760 may further comprise the steps of:

760:1 The receiver measure at time n, the quality of the received signal, or more specifically the power of the coherently combined signal, $C_r$, the relay induced noise measured at the receiver, $N_r$, and the internal noise in the receiver $N_i$.

760:2 The receiver determines based on the measurement of step 775:1, and conditioned a desired $\Gamma_0$ target, an update of at least one of the normalization factor, $\phi^{(n+1)}$ and the aggregate relay power $P_{RS}^{(n+1)}$.

760:3 The receiver distributes the updates, $P_{RS}^{(n+1)}$ and $\phi^{(n+1)}$, to all relays through a multicast control message.

Similarly, the second control loop, indicated in step 775, may optionally comprise:

775:1 The receiver update the transmitter (BS) power $P_{BS}^{(n+1)}$.

The control of relay mode parameters, for an arbitrary cooperative relays scheme, may more generally be characterized by objective function $f_1$ according to at least a first link characteristics as well as a second link characteristic, i.e. $f_1(\Gamma_{RS,k}, \Gamma_{MS,k})$.

Relay Stations Activation Control

The method and architecture of the present invention may advantageously be used for deciding which relay stations 215:k to include in a communication, either at the establishment of the communication or during the communication session. As some relays experiencing poor SNR conditions on either link (transmitter-relay and relay-receiver) or both, they may contribute very little to the overall SNR improvements. Yet, those relays may still consume significant power due to receiver, transmitter and signal processing functions. It may also be of interest to have some control means to localize relay interference generation to fewer relays. Hence, it may therefore be considered to be wasteful to use some of the relay stations.

Consequently, one desirable function is to activate relays based on predetermined criteria. Such criteria may be a preset lower threshold of acceptable SNR on either link, both links or the combination to the effective SNR. The limit may also be adaptable and controlled by some entity, preferably the receiver station as it has information on monetary effective SNR. The relay may hence, e.g. together with power control information and cannel estimation symbols, receive a relay activation SNR threshold $\Gamma_{Active}$ from the receiver to which the expected SNR contribution is compared against, and if exceeding the threshold, transmission is allowed, else not. The relay activation SNR threshold $\Gamma_{Active}$ corresponds to a common transmission parameter, preferably determined by the receiver 220' and distributed to the relay station 215. The actual decision process, in which each relay station uses local parameters (corresponding to the relative transmission parameters) is distributed to the relay stations in the manner provided by the inventive method and architecture. This test, preferably performed in each relay prior to transmission, may e.g. be formulated according to:

$$\frac{\Gamma_{RS,k} \cdot (\Gamma_{RS,k} + 1) \cdot \Gamma_{MS,k}^2}{\varphi^{(n+1)} \cdot (\Gamma_{RS,k} + \Gamma_{MS,k} + 1)^2} \begin{cases} > \Gamma_{Active} \Rightarrow \text{Transmit} \\ \leq \Gamma_{Active} \Rightarrow \text{Silent} \end{cases} \quad (9)$$

but other conditions, depending on relay methods including alternative relay diversity techniques, can also be used. For instance, the relay activation condition may more generally be characterized as an objective function $f_2$ according to $f_2(\Gamma_{RS,k}, \Gamma_{MS,k})$.

Moreover, The broadcasted message containing the $\Gamma_{Active}$ could further comprise fields that may be used to pinpoint specific relays (through assigned relay addresses) that should be incorporated, or is only allowed to be used, or must excluded or any combination thereof. Other methods to address certain relays may e.g. be based on address ranges. This enables one to limit the number of involved relays as desired.

From the above discussion and expression (9) it can be noted that the receiver 220' may, upon experiencing weakening SNR, for example due to the movement of the MS, choose to order a increased transmission power and/or to include more relay stations 215 by lowering the threshold $\Gamma_{Active}$. Other communication quality conditions, such as packet or bit error rate, may also be used by the receiver to trigger changes in the common parameters, such as a joint transmit power scaling of all relay powers.

Relay activation control may be incorporated in the power and phase control algorithm described with reference to FIG. 7, by modifying the steps 750-770, so that:

in 750: the receiver 220' also determines an activation SNR threshold $\Gamma_{Active}$ in 760: the receiver 220' also broadcast $\Gamma_{Active}$ to relay stations 215:k.

in 770: each relay station 215:k firstly determines if to broadcast using the activation SNR threshold $\Gamma_{Active}$, for example according to expression (9).

The system according to an example embodiment is not limited to a specific configuration with regards to the actual location and distances between relay stations and transmitter/receiver. On the contrary, the relay activation, for example, offered by the invention, provides a great flexibility in coping with different and varying radio environment. However, certain combinations of transmission technology and geographical configuration are particularly advantageous. It can, for example, be shown that using the coherent combining system according to the example embodiment, it generally better (in terms of throughput/or equivalently SNR) to place relays in between the transmitter and the receiver, rather than just beside the transmitter/receiver.

Figure 8:
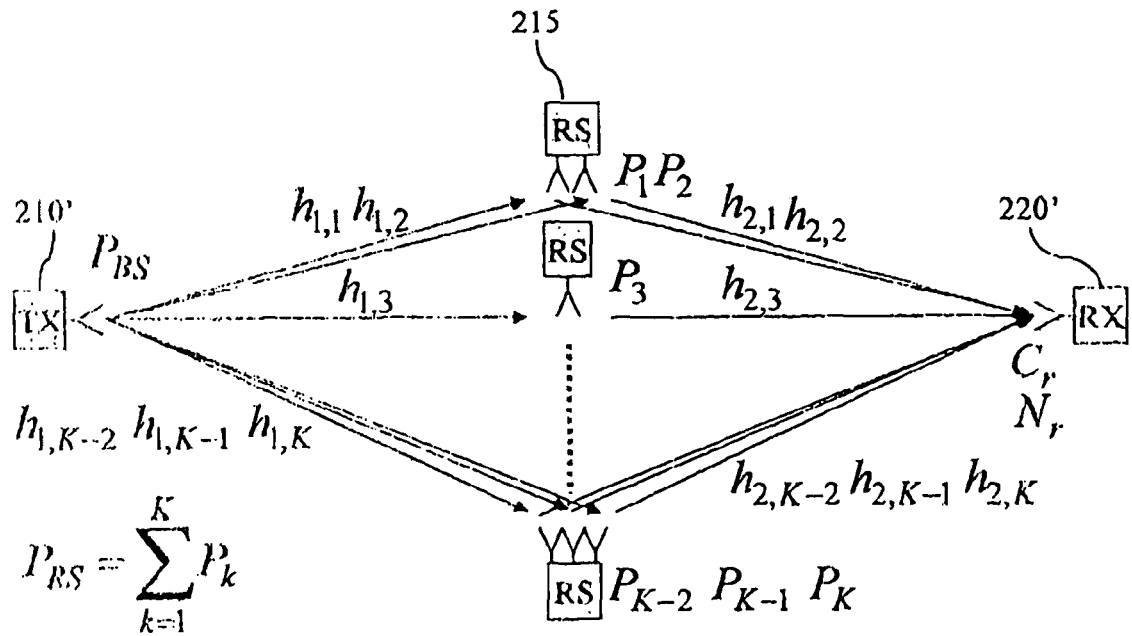
FIG. 8 is a schematic illustration of an alternative example embodiment utilizing relay stations with multiple antennas.

The method and architecture according the present technology may be adapted to other topologies than the above exemplified. The topology in FIG. 5 may, for example, be modified to include multiple antennas in each relay station as shown in FIG. 8. The benefit in doing that is that the number of relay stations can be reduced while still getting similar total antenna directivity gain. If each antenna element is separated more than the coherence distance, diversity gain is also provided. In all, this can reduce the cost, while providing near identical performance. However, reducing the number of relays may have a detrimental impact due to shadowing (i.e. log normal fading) and must be carefully applied. From signal, processing and protocol point of view, each antenna can be treated as a separate relay station. Another benefit of this approach is however that internal and other resources and may be shared. Moreover, relaying may potentially be internally coordinated among the antennas, thereby mitigate interference generation towards unintended receivers.

Figure 9:
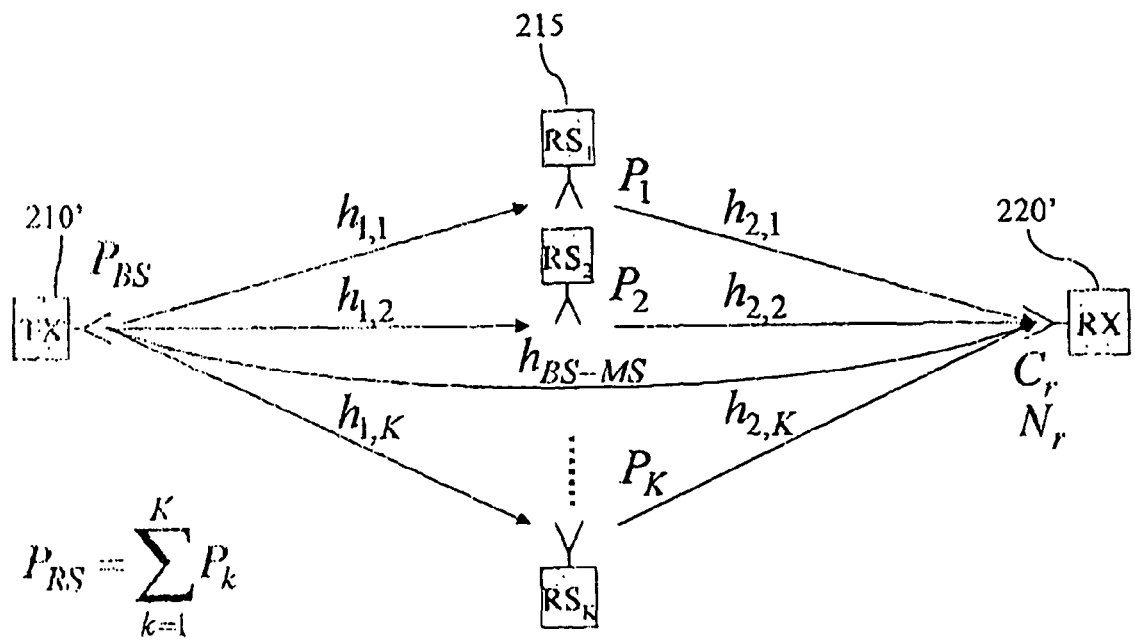
FIG. 9 is a schematic illustration of an alternative example embodiment utilizing direct transmission between the transmitter and the receiver.

The communication quality may be further improved by also incorporate the direct signal from the transmitter 210' to the receiver 220'. There are at least two conceivable main methods to incorporate the signal from the transmitter. FIG. 9, depicts the topology when direct transmission from the transmitter is also considered.

In the first method, two communication phases are required. The receiver combines the signal received directly from the transmitter, in the first phase, which the relay transmission, from the second phase. This is somewhat similar to receive based combining in the classical relay channel, but with coherent combining based relaying. Maximum ratio interference rejection combining may be employed.

In the second method, Transmit-relay oriented Coherent Combining, only one communication phase is used, and used for coherent combining of the direct signal from the transmitter to the receiver with the relay signals. This can be made possible if relays can transmit and receive concurrently, e.g. over separated antennas. The phase of $\alpha_k$ must then ensure alignment of relayed signal with the direct signal as $$\arg\{\alpha_k\}=-\arg\{h_{1,k}\}-\arg\{h_{2,k}\}-\arg\{h_{BS,MS}\}+c_1$$

, where $h_{BS,MS}$ is the complex channel from the basestation to the mobile station. A consequence of incorporating the direct signal for coherent combining is that the relays must adaptively adjust their phase relative the direct signal. A closed loop can be used for this. Similar to the normalization factor power control, the receiver issues phase control messages to the whole group of relay stations, but with a delta phase 0 to subtract from the calculated phase compensation ($-\arg\{h_{1,k}\}-\arg\{h_{2,k}\}$).

As the basestation does not induce any noise through its transmission, its transmit power does not need to be adjusted for optimal performance as was needed for the relays. Instead, performance increases monotonically with increasing basestation transmit power. One option is however to try to minimize the overall transmit power, aggregate relay power and basestation power. The parameter setting for this is similar to what has been derived in the discussion on regenerative relaying, assuming that the basestation is considered as a relay. In addition to above, multiple antenna elements at the transmitter may also be used, similar to the discussions on relays with multiple antennas.

The derivation of the relative and common transmission parameters is also directly applicable to multi carrier transmission, such as OFDM by handling each subcarrier independently. This will then include a common amplitude normalization, phase and distributed relay amplitude compensation per subcarrier. For doing this, the path over FFT-processing-IFFT is taken, or possible through time domain filtering. The power control may send a normalization factor $\phi$ and relay power indication $P_{RS}$ in vector form to optimize performance per subcarrier. A more practical solution, is to send $\phi$ and $P_{RS}$ as scalars, acting on all subcarriers. In case of subcarrier optimization, the power control may then try to minimize power the total transmit power overall all subcarriers to meet desired communication quality. This then provides some diversity gain in the frequently domain.

Another OFDM aspect is that it is a preferred choice for the transmit-relay oriented Coherent Combining described above. The reason is that the cyclic prefix allow for some short relay transfer latency, where phase and amplitude is modified through a time domain filter enabling immediate transmission.

For single carrier transmissions, such as CDMA, and with frequency selective channels, a frequency domain operation similar to OFDM may be employed or optically the phase alignment can be performed on the strongest signal path, or with a time domain filter as discussed for OFDM.

For coherent combining to work, it is important to synchronize relay station frequency to a common source. In a cellular system, the BS is a natural source as since the clock accuracy is generally better at the basestation than in any mobile station. This function can exploit the regular frequency offset compensation as performed in traditional OFDM receiver implementations, that mitigates inter channel interference.

However, the relays may optionally exploit GPS for frequency synchronization, is available.

In the following, an exemplary protocol embodiment of the technology is given based on the assumption that the relays perform all channel estimation necessary for coherent combining based cooperative relaying. The scheme is based on open loop phase control (meaning reciprocal channel in e.g. TDD) and closed loop power control. Note that only the control signalling from the receiver 220' to the relay stations 215 is discussed, and the receiver to transmitter control is not explicitly considered. Yet, it should be understood that the receiver can send control information to the transmitter as individual control messages or as part of the relay control messages.

Figure 10:
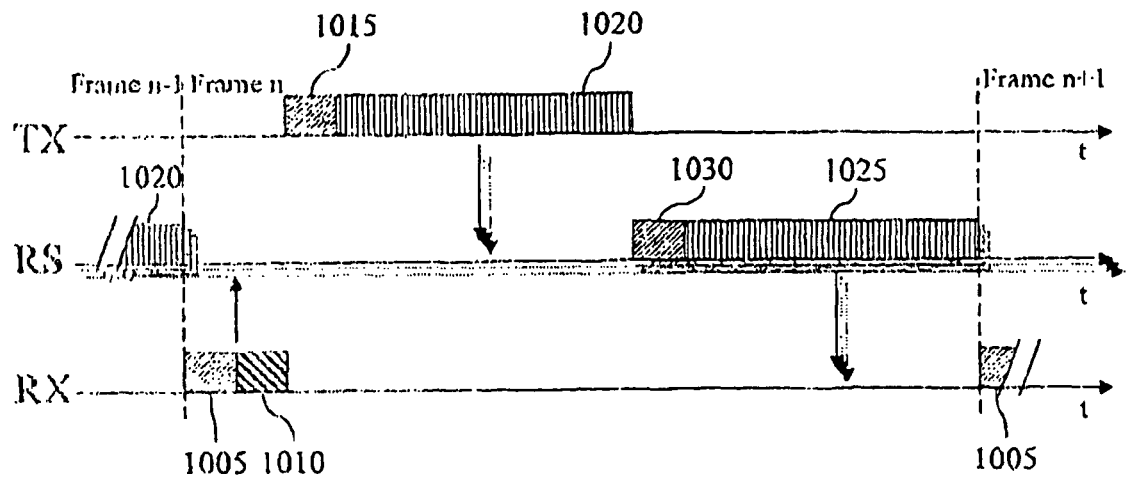
FIG. 10 is a schematic illustration of an exemplary MAC with coherent combining based cooperative relaying according to an example embodiment.

FIG. 10 shows that the relays perform channel estimation for both links as well as receiving power control information that is derived from earlier communication. Considering in this example the frame n:
a) the relay station(s) receive channel estimation symbols 1005 and control information 1010, which is based on previous transmissions;
b) the transmitter sends channel estimation symbols 1015 and data 1020 to the relay stations;
c) the relay stations adjust phase and amplitude of the received data signal and forward it (data 1025) concurrently to the receiver, optional including channel estimation symbols 1030.

The order of messages could be changed (with some restrictions), but the operation of the scheme would still be the same. E.g. the transmitter may first send channel estimation symbols and data to the relays, then the receiver send channel estimation symbol and control information to the relay. Subsequently, the relays adjust phase and amplitude of the received data signal and forward it concurrently to the receiver.

Note that durations are not indicated to scale and that the channel estimation symbol may optionally not be used over the second link.

Figure 11:
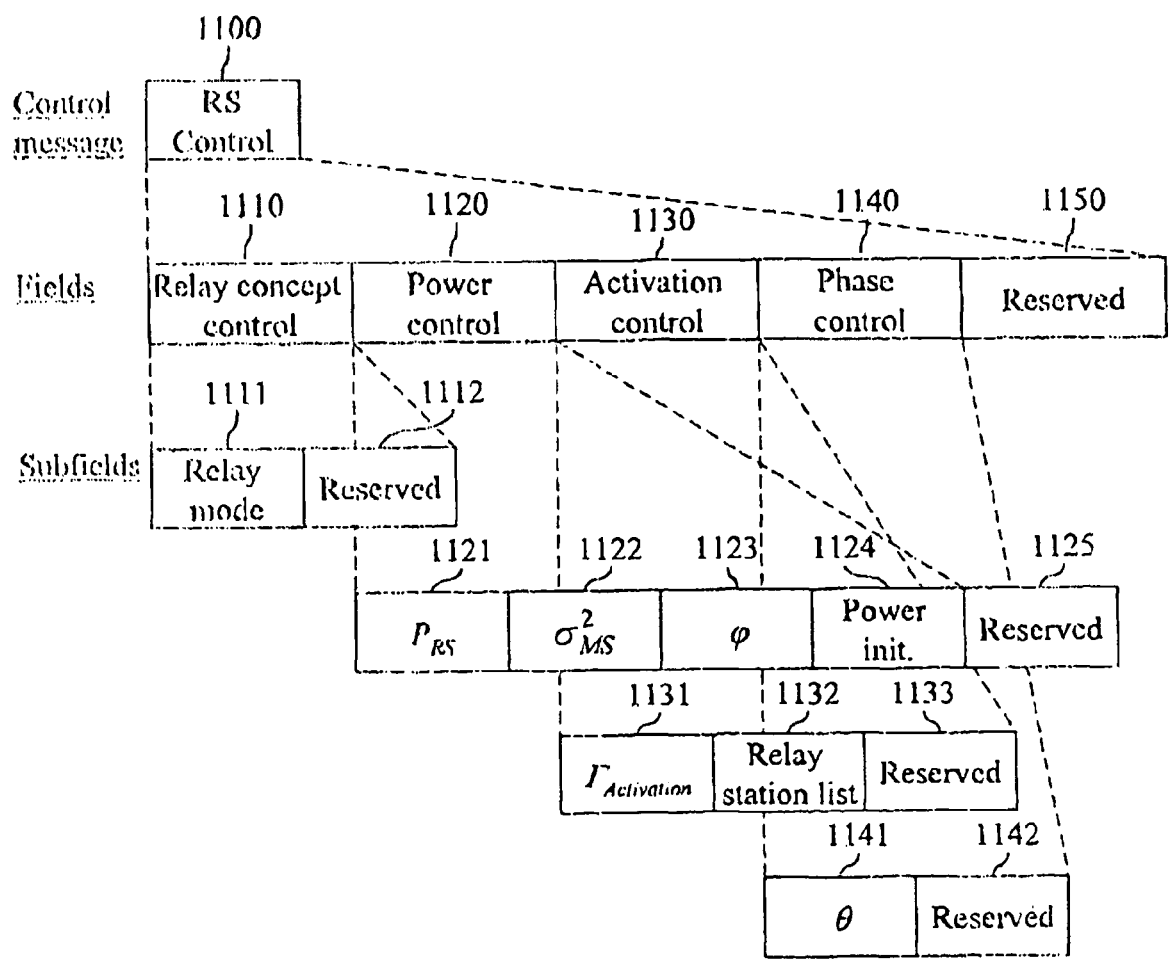
FIG. 11 schematically illustrates an example of a control message format.
Figure 4:
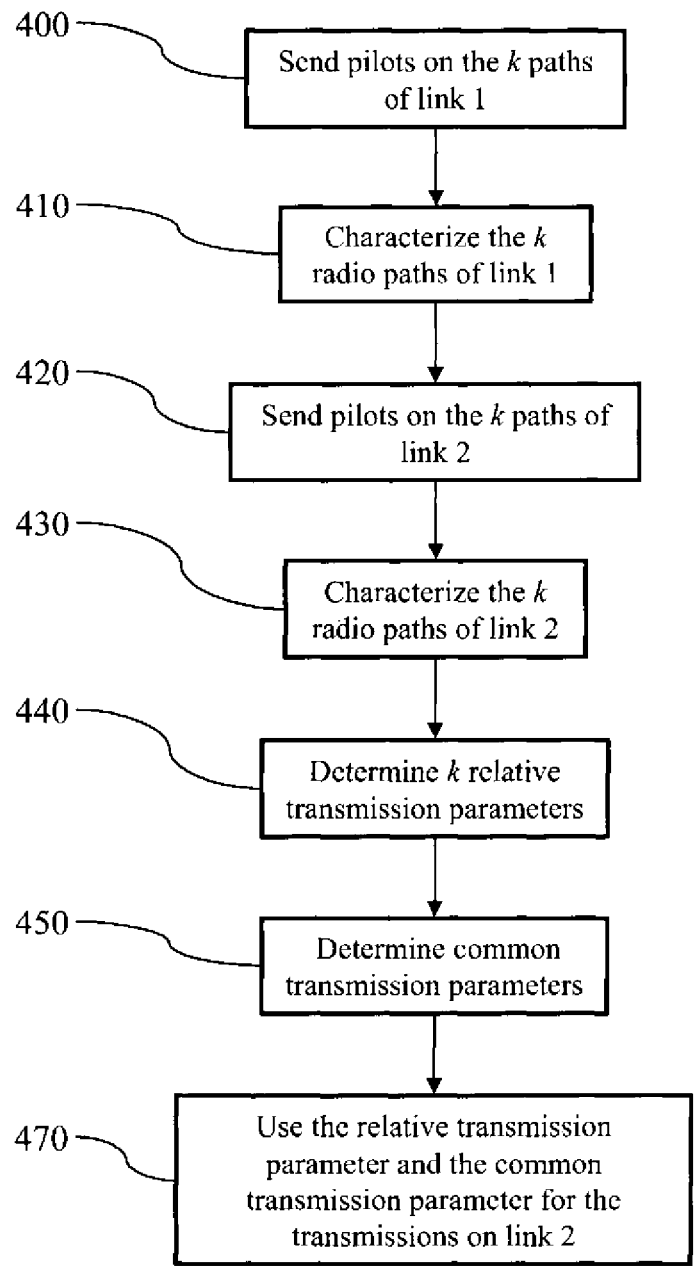

A control message suitable for the control information used in the method according to an example embodiment, schematically illustrated in FIG. 11, should preferably be generically built to be able to control, support and to be expanded to a range of various relay concepts, such as Alamouti based diversity, cyclic delay diversity and coherent combining etc. The focus here is however on the functions and concept given explicitly in the example embodiment. The first field of the control message 1100 is the relay concept field 1110, which in subfield relay mode 1111, state the type of relay concept in use. With this information, relays may change mode of operation depending on situation. Given that coherent combining or similar is used, the next field, the power control field 1120, indicates with subfields, relay power $P_{RS}$ 1121, the noise plus interference level at the mobile station $\sigma_{MS}^2$ 1122, the normalization factor $\phi$ 1123 and power initialization parameters 1124. Power initializations parameters that may be used are initially desired receive power level to aim for, e.g. $\Gamma_0$. When the control loop acts, this field can be set to indicate that it should not be used.

The next field relate to the relay activation control 1130. Here, it is possible to in subfields set a minimum required SNR contribution level $\Gamma_{Active}$ 1131, but also to specify a set of relay station IDs that should be active 1132.

The last field, the phase control field 1140 may be used if a phase-offset common to all relays stations is desired, with a subfield specifying the offset $\theta$ 1141. This is useful if it is desired to phase align the relay signals with a direct signal from the transmitter, provided the relays forwarded the received signal directly.

If needed, more functions may be added or the specifies of each function may be complemented, by using and expanding the control message structure and use any reserved fields. Reserved fields 1150, 1112, 1125, 1133, and 1142 are preferably on every level in the control message. In addition to this, the control message (or optionally a separated field or message) may also contain used transmit power for the receiver, so the relay-receiver gain can be determined.

While the invention has been described in connection with what is presently considered to be the most practical and preferred embodiments, it is to be understood that the invention is not to be limited to the disclosed embodiments, but on the contrary, is intended to cover various modifications and equivalents included within the spirit and scope of the appended claims.

Detailed Derivations

In the analysis we assume that there are K relay stations arbitrarily located. Each relay station $k \in \{1, 2, \ldots, K\}$ receives a signal composed of an attenuated version of the desired signal, e.g. modeled as complex Gaussian $x \sim N(0,1)$, as well as a noise plus interference term, $n_{RS,k}$, according to $$y_k = h_{1,k}\sqrt{P_{BS}} \cdot x + n_{BS,k}$$

where $h_{1,k}$ is the complex path gain from the basestation to the relay station k and $P_{BS}$ is the transmit power of the basestation.

In the relay, $y_k$ is (for analytical tractability) normalized to unit power, and multiplied with a complex factor that generates output $z_k$. Subsequently $z_k$ is sent over link two, towards the receiver and is on its way attenuated with complex path gain $h_{2,k}$, where it is super-positioned with signals from outer relays and noise and interference is added.

As it is assumed that each relay normalize the received power plus noise to unit power prior amplification and phase adjustment, the relay transmit power constraint can be incorporated in the analysis by letting each station k use transmit power $$P_L = \frac{P_{RS} \cdot |a_k|^2}{\sum_{k=1}^{K} |a_k|^2}$$

where $P_{RS}$ is the total transmit power of all relay stations, and $\alpha_k$ is a un-normalized complex gain factor for relay station k.

For aggregate power constrained relay transmission, the SNR at the receiver (Mobile Station, MS, assumed here) may then be written $$\Gamma = \frac{\left| \sum_{k=1}^{K} \frac{\sqrt{P_{RS}} \cdot a_k}{\sqrt{\sum_{q=1}^{K} |a_q|^2}} \cdot \frac{h_{1,k} \cdot \sqrt{P_{RS}}}{\sqrt{|h_{1,k}|^2 P_{BS} + \sigma_{RS,k}^2}} \cdot h_{2,k} \right|^2}{\sum_{k=1}^{K} \frac{P_{RS} |a_k|^2}{\sum_{q=1}^{K} |a_q|^2} \frac{\sigma_{RS,k}^2}{|h_{1,k}|^2 P_{RS} + \sigma_{RS,k}^2} \cdot |h_{2,k}|^2 + \sigma_{MS}^2},$$

where $\sigma_{MS}^2$ is the noise plus interference level at the mobile station.

A condition for coherent combining is phase alignment of signal, which can be achieved by ensuring $$\arg\{\alpha_k\} = -\arg\{h_{1,k}\} - \arg\{h_{2,k}\} + c_1,$$

where $c_1$ is an arbitrary constant

The expression for the effective SNR resulting from coherent combing may then be rewritten as $$\Gamma_{Eff} = \frac{\left| \sum_{k=1}^{K} |a_k| \cdot \frac{\sqrt{\Gamma_{RS,k}} \cdot \sqrt{\Gamma_{MS,k}}}{\sqrt{\Gamma_{RS,k} + 1}} \right|^2}{\sum_{k=1}^{K} |a_k|^2 \cdot \frac{\Gamma_{MS,k} + \Gamma_{RS,k} + 1}{\Gamma_{RS,k} + 1}},$$

, where $$\Gamma_{RS,k} = \frac{|h_{1,k}|^2 P_{RS}}{\sigma_{RS,k}^2},$$

, and $$\Gamma_{MS,k} = \frac{|h_{2,k}|^2 P_{RS}}{\sigma_{MS,k}^2}$$

Note that $\Gamma_{MS,k}$ is a "virtual SNR" in the sense that it is the SNR if relay station k would use all aggregate relay stations transmit power by itself.

It is noticed that the SNR expression has the form $$\Gamma_{Eff} = \frac{\left| \sum_{k=1}^{K} |a_k| \cdot c_{1,k} \right|^2}{\sum_{k=1}^{K} |a_k|^2 \cdot c_{2,k}}$$

which can be transformed by using $$|b_k|^2 = |a_k|^2 \cdot c_{2,k},$$

which yields $$\Gamma_{Eff} = \frac{\left|\sum_{k=1}^{K} |b_k| \cdot \frac{c_{1,k}}{\sqrt{c_{2,k}}}\right|^2}{\sum_{k=1}^{K} |b_k|^2}$$

Now, the nominator is upper limited by Cauchy-Schwarz's inequality $$\left|\sum_{k=1}^{K} |b_k| \cdot \frac{c_{1,k}}{\sqrt{c_{2,k}}}\right|^2 \leq \sum_{k=1}^{K} |b_k|^2 \cdot \sum_{k=1}^{K} \left|\frac{c_{1,k}}{\sqrt{c_{2,k}}}\right|^2,$$

, hence for an optimal $b_k$ equality can be attained and the resulting SNR is then $$\Gamma_{Eff}^{(max)} = \frac{\left|\sum_{k=1}^{K} |b_k| \cdot \frac{c_{1,k}}{\sqrt{c_{2,k}}}\right|^2}{\sum_{k=1}^{K} |b_k|^2} = \frac{\sum_{k=1}^{K} |b_k|^2 \cdot \sum_{k=1}^{K} \left|\frac{c_{1,k}}{\sqrt{c_{2,k}}}\right|^2}{\sum_{k=1}^{K} |b_k|^2}$$

This may be conveniently expressed in SNRs as $$\Gamma_{Eff}^{(max)} = \sum_{k=1}^{K} \frac{\Gamma_{RS,k} \cdot \Gamma_{MS,k}}{\Gamma_{RS,k} + \Gamma_{MS,k} + 1}$$

Through identification, it is seen that the maximum SNR can be attained if $$|b_k| = Const \cdot \frac{c_{1,k}}{\sqrt{c_{2,k}}},$$

where Const is an arbitrary constant that can be set to one for convenience.

Form power control perspective, it is interesting to note that the nominator is exactly the square of the dominator for optimum SNR. This knowledge can therefore be used as a power control objective.

Using the reverse transformation, one yields $$|a_k| = \frac{c_{1,k}}{\sqrt{c_{2,k}}}$$

, or expressed in SNRs $$|a_k| = \frac{\sqrt{\Gamma_{RS,k}} \cdot \sqrt{\Gamma_{MS,k}} \cdot \sqrt{\Gamma_{RS,k} + 1}}{\Gamma_{RS,k} + \Gamma_{MS,k} + 1}$$

Hence a relay receiving a signal $y_k$ can determine $z_k$ by determining $$z_k = \frac{\sqrt{P_{RS}}}{\sqrt{\sum_{k=1}^{K} |a_k|^2}} \cdot \frac{e^{-j(\arg(h_{1,k}) + \arg(h_{2,k}))} \cdot \sqrt{\Gamma_{RS,k}} \sqrt{\Gamma_{MS,k}} \sqrt{\Gamma_{RS,k} + 1}}{\Gamma_{RS,k} + \Gamma_{MS,k} + 1} \cdot \frac{y_k}{\sqrt{|h_{1,k}|^2 P_{RS} + \sigma_{RS,k}^2}}$$

$$= y_k \cdot \frac{1}{\sqrt{\sum_{k=1}^{K} |a_k|^2}} \cdot \frac{\sqrt{P_{RS} \cdot \Gamma_{RS,k} \cdot \Gamma_{MS,k}}}{\sigma_{RS,k} \cdot (\Gamma_{RS,k} \cdot \Gamma_{MS,k} + 1)} \cdot e^{-j(\arg(h_{1,k}) + \arg(h_{2,k}))}$$

Regenerative Relaying Add-On

If the SNR at a relay station is high enough, the received signal may be decoded prior relaying the signal. To model this behavior, let's say that larger than a minimum SNR, $\Gamma_{Decode}$, is sufficient for decoding. The benefit in doing this is that forwarding of detrimental noise (and interference) can be avoided all together, and hence result in a further enhanced SNR at the receiver. In this case however, the decoded signal should be phase compensated only for the second loop, i.e.

$$\arg\{\alpha_k\} = -\arg\{h_{2,k}\}$$

By setting $\sigma_{RS,k}^2 = 0$ for those stations in the previous expressions, one can derive the magnitude of the multiplicative factor $|\alpha_k|$ as well as the contribution to the SNR improvement. The combination of both noise-free (regenerative) and noisy (non-regenerative) transmission then takes the form $$\Gamma_{Eff}^{(max)} = \sum_{k=1}^{K} \begin{cases} \frac{\Gamma_{RS,k} \cdot \Gamma_{MS,k}}{\Gamma_{RS,k} + \Gamma_{MS,k} + 1}, & \text{if } \Gamma_{RS,k} < \Gamma_{Decode} \\ \Gamma_{MS,k} & \text{if } \Gamma_{RS,k} \geq \Gamma_{Decode} \end{cases}, \text{and}$$

$$|a_k| = \begin{cases} \frac{\sqrt{\Gamma_{RS,k}} \cdot \sqrt{\Gamma_{MS,k}} \cdot \sqrt{\Gamma_{RS,k} + 1}}{\Gamma_{RS,k} + \Gamma_{MS,k} + 1} & \text{if } \Gamma_{RS,k} < \Gamma_{Decode} \\ \sqrt{\Gamma_{MS,k}} & \text{if } V_{RS,k} \geq \Gamma_{Decode} \end{cases}, \text{and}$$

$$\arg\{a_k\} = \begin{cases} -\arg\{h_{1,k}\} - \arg\{h_{2,k}\} & \text{if } \Gamma_{RS,k} < \Gamma_{Decode} \\ -\arg\{h_{1,k}\} & \text{if } \Gamma_{RS,k} \geq \Gamma_{Decode} \end{cases}$$

Note that $\Gamma_{RS,k} < \Gamma_{Decode}$ is only a model useful to assess performance in a mixed non-regenerative and regenerative relaying scenario. In practice, the upper expressions, i.e. corresponding to $\Gamma_{RS,k} < \Gamma_{Decode}$, are used when the signal is not forwarded in a non-regenerative manner, and the lower expressions, i.e. corresponding to $\Gamma_{RS,k} > \Gamma_{Decode}$, are used when the signal is not forwarded in a regenerative manner.

REFERENCES

[1]. J. N. Laneman, *Cooperative Diversity in Wireless Networks: Algorithms and Architectures*, Ph.D. Thesis, Massachusetts Institute of Technology, Cambridge, Mass., August 2002. <Thesis>

[2]. J. N. Laneman and G. W. Wornell, "An Efficient Protocol for Realizing distributed Spatial Diversity in Wireless Ad-Hoc Networks," in *Proc. of ARL FedLab Symposium on Advanced Telecommunications and Information Distribution* (ATIRP-2001), (College Park, Md.), March 2001. <Report>

[3]. J. N. Laneman and G. W. Wornell, "Energy-Efficient Antenna-Sharing and Relaying for Wireless Networks," in *Proc. IEEE Wireless Communications and Networking Conference* (WCNC-200). (Chicago, Ill.), September 2000.

[4]. B. Schein and R. Gallagher, "The Gaussian parallel relay network," in IEEE International Symposium on Information Theory ISIT2000, Sorrento, Italy, Jun. 25-30, 2000.

[5]. B. Schein, "Distribution Coordination in Network Information Theory," PhD thesis, pp. 64-68, MIT, Cambridge, Mass., August 2001. Lippman, Bletsas

[6]. T. M. Cover and A. A. El Gamal, "Capacity theorems for the relay channel," IEEE Trans. Inform. Theory, vol. 25, no. 5, pp. 572-584, September 1979.

[7]. E. V. D. Meulen, "Three-terminal communication channels," Advances in Applied Probability, vol. 3, pp. 120 154, 1971.

[8]. A. Sendonaris, E. Erkip, B. Aazhang, "Increasing CDMA Cell Capacity via In-Cell User Cooperation", Department of Electrical and Computer Engineering, Rice University, Poster Titles, Nov. 11, 1997.

[9]. M. Dohler, E. Lefrane, H. Aghvami, "Virtual Antenna Arrays for Future Wireless Mobile Communication System," ICT2002, June 2002

[10]. G. W. Wornell, V. Poor, "Wireless Communications: Signal Processing Perspectives (Prentice Hall Signal Processing Series) Prentice Hall; 1st edition (April 1998).

The invention claimed is:

1. A method of performing communication in a wireless communication network using cooperative relaying, wherein a transmitter, a receiver and a plurality of relay stations are engaged in a communication session, and each relay station forwards signals from a first link between the transmitter and the relay station to a second link between the relay stations and the receiver, wherein each relay station forwards the signal with the use of a relative transmission parameter specific for each relay station, said relative transmission parameter being determined locally in each relay station and at least partly based on a characterization of radio transmission conditions for that relay station, and the use of at least one common transmission parameter, and wherein the common transmission parameter is at least partly based on a measure of the total communication quality between the transmitter and a receiver of a mobile station.

2. The method according to claim 1, wherein each relative transmission parameter is based on a characterisation of a radio path of the first link.

3. The method according to claim 1, wherein each relative transmission parameter is based on a characterisation of a radio path of the second link.

4. The method according to claim 2, wherein the relative transmission parameter is based on a combination of the characterisation of a radio path of the first and second link.

5. The method according to claim 1, wherein said common transmission parameter is determined centrally and distributed to each relay station.

6. The method according to claim 5, wherein said at least one common transmission parameter is determined in the receiver and multicasted to each relay station.

7. The method according to claim 1, wherein the method is used for either phase control, power control or relay activation or any combination of phase control, power control, and relay activation.

8. A method of performing communication in a wireless communication network using cooperative relaying, wherein a transmitter, a receiver and a plurality of relay stations are engaged in a communication session, and each relay station forwards signals from a first link between the transmitter and the relay station to a second link between the relay stations and the receiver, wherein each relay station forwards the signal with the use of a relative transmission parameter specific for each relay station, said relative transmission parameter being determined locally in each relay station and at least partly based on a characterization of radio transmission conditions for that relay station, and the use of at least one common transmission parameter, and wherein the common transmission parameter is at least partly based on a measure of the total communication quality between the transmitter and a receiver of a mobile station, and wherein the at least one common transmission parameter comprises a relay activation threshold, which is multicasted from the receiver to the relay stations and said relay activation threshold specifies, conditions which the relay stations must fulfill in order to be active in the forwarding of the signal on the second link.

9. The method according to claim 8, wherein the relay condition comprises a parameter characterizing the first link, or the second link, or a combination of the first link and the second link.

10. The method according to claim 8, wherein the multicasted common parameter comprises a specification of which relay stations that should be activated or deactivated.

11. The method according to claim 7, wherein the method comprises the steps of:
   characterizing the radio paths of the first and second link by the use of pilots;
   determining in each relay station at least one relative transmission parameter at least partly based on one, or both, of the channel characterizations of each relay stations paths of the first and second link;
   determining in the receiver at least one common transmission parameter;
   broadcasting said common transmission parameter to the relay stations;
   using in each relay station the relay station's respective relative transmission parameter and the common transmission parameter in the forwarding of the signal on the second link.

12. The method according to claim 7, wherein the method comprises the steps of:
   sending pilots on the k paths of link 1, from transmitter to relay stations, and on the k paths of link 2, from receiver to relay stations;
   estimating in each relay station the k channel of link 1, $h_{1,k}$, and the k channel of link 2, $h_{2,k}$;
   determining in each relay station the relative transmission parameter or a set of relative transmission parameters, wherein the relative parameter is based on one, or both, of the channel estimates $h_{1,k}$, $h_{2,k}$ characterizing each path;

determining in the receiver the common transmission parameter, or a set of common transmission parameters, based on the total communication quality experienced by the receiver;

broadcasting by the receiver the common transmission parameter(s) to the relay stations;

using in each relay station the relay station's respective relative transmission parameter and the common transmission parameter(s) to adapt the subsequent transmissions on link 2.

13. The method according to claim 12, wherein the method further comprises the step of feeding back control information from the receiver to the transmitter.

14. A method of performing communication in a wireless communication network using cooperative relaying, wherein a transmitter, a receiver and a plurality of relay stations are engaged in a communication session, and each relay station forwards signals from a first link between the transmitter and the relay station to a second link between the relay stations and the receiver, wherein each relay station forwards the signal with the use of a relative transmission parameter specific for each relay station, said relative transmission parameter being determined locally in each relay station and at least partly based on a characterization of radio transmission conditions for that relay station, and the use of at least one common transmission parameter, and wherein the common transmission parameter is at least partly based on a measure of the total communication quality between the transmitter and a receiver of a mobile station, wherein the method further comprises the steps of:

sending pilots on k paths of link 1, from transmitter to the relay stations, and on the k paths of link 2, from the receiver to the relay stations;

estimating in each relay station the k channel of link 1, $h_{1,k}$ and the k channel of link 2, $h_{2,k}$;

determining in each relay station a relative transmission parameter or a set of relative transmission parameters, wherein the relative parameter is based on one, or both, of the channel estimates $h_{1,k}$, $h_{2,k}$ characterizing each path;

determining in the receiver the common transmission parameter, or a set of common transmission parameters, based on the total communication quality experienced by the receiver;

broadcasting by the receiver the common transmission parameter(s) to the relay stations;

using in each relay station the relay station's respective relative transmission parameter and the common transmission parameter(s) to adapt the subsequent transmissions on link 2; and wherein the step of using the relay station's respective relative transmission parameter and the common transmission parameter(s) to adapt the subsequent transmissions on link 2, comprises to, on reception of signal $y_k$, transmitting the signal:

$$z_k = y_k \cdot \frac{1}{\varphi} \cdot \frac{\sqrt{P_{RS} \cdot \Gamma_{RS,k} \cdot \Gamma_{MS,k}}}{\sigma_{RS,k} \cdot (\Gamma_{RS,k} + \Gamma_{MS,k} + 1)} \cdot e^{-j \cdot (\arg(h_{1,k}) + \arg(h_{2,k}))}$$

wherein the parameters $\Gamma_{RS,k}$ and $\Gamma_{MS,k}$ are the locally determined relative transmission parameters based on the channel estimates $h_{1,k}$ and $h_{2,k}$, $\sigma_{RS}^2$ is a noise and interference level at the relay station, $P_{RS}$ is an aggregated transmit power from all relay stations, and wherein a normalizing factor $\varphi$ is a common parameter based on the total communication quality experienced by the receiver and broadcasted from the receiver.

15. The method according to claim 12, wherein the steps of determining, broadcasting and using the common transmission parameter represent a first control loop and the step of feeding back to the transmitter represent a second control loop from the receiver to the relay stations and the transmitter, respectively.

16. The method according to claim 15, wherein the first control loop further comprises the substeps of:

the receiver measuring at time n, the quality of the received signal $C_r$, the relay induced noise $N_r$, and the internal noise in the receiver $N_i$;

the receiver determines based on the previous measurement, and a desired SNR-target $\Gamma_0$, an update of at least one of the normalization factor $\phi^{(n+1)}$ and the aggregate relay power $P_{RS}^{(n+1)}$;

the receiver distribute the updates, $P_{RS}^{(n+1)}$ and $\phi^{(n+1)}$, to all relays through a multicast control message.

17. The method according to claim 15, wherein the second control loop further comprises the substep of the receiver updating the transmitter power $P_{BS}^{(n+1)}$.

18. A system adapted for communication in a wireless communication network using cooperative relaying, the system comprises a transmitter, a receiver and at least one relay station, wherein the relay station is adapted to forward signals from a first link between the transmitter and the relay station to a second link between the relay stations and the receiver, said system has a logical architecture wherein:

at least one relay station has means for performing channel characterization and means for determining relative transmission parameters based on channel characterization and means for adapting the forwarding based on a common transmission parameter and a relative transmission parameter;

the receiver has means for determining a common transmission parameter and means for distributing the common transmission parameter to the relay stations, wherein the common transmission parameter is at least partly based on a measure of the total communication quality between the transmitter and a receiver of a mobile station; and the logical architecture comprises a first control loop between the receiver and the relay stations adapted to feedback the common parameter from receiver to the relay stations; and wherein the relative transmission parameter is based on at least one of the following: a characterisation of a radio path of the first link; a characterisation of a radio path of the second link: and a combination of the characterisation of a radio path of the first and second link.

19. The system according to claim 18, further comprising a second control loop between the receiver and the transmitter adapted to feedback the transmission parameters from receiver to the transmitter.

20. The system according to claim 18, wherein each relay station is adapted to perform the channel characterization on its radio path of the first link.

21. The system according to claim 18, wherein each relay station is adapted to perform the channel characterization on its radio path of the second link.

22. The system according to claim 20, wherein each relay station is adapted to base the determination of the relative transmission parameter on a combination of the characterisation of a radio path of the first and second link.

23. The system according to claim 18, wherein the system is adapted to utilize the relative transmission parameter and the common transmission parameter for either phase control, power control or relay activation or any combination of phase control, power control, and relay activation.

24. A relay station adapted for use in a wireless communication network using cooperative relaying, wherein the relay station is adapted to forward signals from a first link between a transmitter and the relay station to a second link between the relay stations and the receiver, wherein the relay station has means for performing channel characterization and means for determining relative transmission parameters based on channel characterization and means for adapting the forwarding at least partly based on the relative transmission parameter and on a common transmission parameter previously received by the relay station, wherein the common transmission parameter is at least partly based on a measure of the total communication quality between the transmitter and a receiver of a mobile station; and wherein the relative transmission parameter is based on at least one of the following: a characterisation of a radio path of the first link; a characterisation of a radio path of the second link; and a combination of the characterisation of a radio path of the first and second link.

25. The relay station according to claim 24, wherein the adapting and forwarding means also are adapted for using a common transmission parameter in the forwarding of the signal to the second link, wherein said common transmission parameter has been distributed to the relay station.

26. The relay station according to claim 24, further comprising means for activating/deactivating the relay station and the activating/deactivating means are responsive to the relative transmission parameter and/or the common transmission parameter.

27. A basestation adapted for use in a wireless communication network using cooperative relaying, wherein the basestation comprises a receiver, and the network comprises a plurality of relay stations, each adapted to forward signals from a first link between a transmitter and the relay station to a second link between the relay station and the receiver of the base station, wherein the receiver of the base station comprises means for determining a common transmission parameter and means for distributing the common transmission parameter to the relay stations, and wherein the common transmission parameter is at least partly based on a measure of the total communication quality between the transmitter and the receiver of the basestation.

28. A mobile station adapted for use in a wireless communication network using cooperative relaying, wherein the mobile station comprises a receiver, and the network comprises a plurality of relay stations, each adapted to forward signals from a first link between a transmitter and the relay station to a second link between the relay station and the receiver of the mobile station, wherein the receiver comprises means for determining a common transmission parameter and means for distributing the common transmission parameter to the relay stations, and wherein the common transmission parameter is at least partly based on a measure of the total communication quality between the transmitter and the receiver of the mobile station.

29. A control message structure adapted for the control signalling in the first control loop according to claim 18, wherein the control message comprises at least one of, or a selection of the fields:

a relay concept field specifying the type of relay concept;
a power control field giving the common transmission parameters used by the relay stations to determine a suitable power for the forwarding on the second link;
a relay activation control field specifying the relay activation threshold and/or specifying relay stations to be activated/deactivated;
a phase control field giving the common transmission parameters used by the relay stations to phase align the signals to be forwarded on the second link.

30. The method according to claim 1, further comprising determining a magnitude for the forwarded signal as a product of the relative transmission parameter and the common transmission parameter.

31. The method according to claim 30, wherein the common transmission parameter is a power normalization factor.

32. The system according to claim 18, wherein each relay station is adapted to determine a magnitude for the forwarded signal as a product of the relative transmission parameter and the common transmission parameter.

33. The system according to claim 32, wherein the common transmission parameter is a power normalization factor.

34. The relay station according to claim 24, further comprising means for determining a magnitude for the forwarded signal as a product of the relative transmission parameter and the common transmission parameter.

35. The relay station according to claim 34, wherein the common transmission parameter is a power normalization factor.

36. The relay station according to claim 24, wherein the at least one common transmission parameter comprises a relay activation threshold, which is multicasted from the receiver to the relay station, and wherein said relay activation threshold specifies conditions which the relay station must fulfill in order to be active in the forwarding of the signal on the second link.

37. A method of operating a relay station in a wireless communication network using cooperative relaying, the method comprising:

receiving first signals on a first link between a transmitter and the relay station;
determining at the relay station a relative transmission parameter specific for the relay station, said relative transmission parameter being at least partly based on a characterization of radio transmission conditions for the relay station;
forwarding the first signal to a second link between the relay station and a receiver with the use of the relative transmission parameter and at least one common transmission parameter, and wherein the common transmission parameter is at least partly based on a measure of the total communication quality between the transmitter and the receiver of a mobile station.

38. The method according to claim 37, wherein the relative transmission parameter is based on a combination of the characterisation of a radio path of the first and second link.

39. The method according to claim 37, wherein the at least one common transmission parameter comprises a relay activation threshold, which is multicasted from the receiver to the relay station, and wherein said relay activation threshold specifies conditions which the relay station must fulfill in order to be active in the forwarding of the signal on the second link.

40. The method according to claim 37, wherein the communications network comprises plural relay stations, and wherein the method further comprises:

receiving pilots on a path of link 1 from the transmitter to the relay station;
receiving pilots on link 2 from the receiver;

at the relay station making a channel estimate of the channel of link 1 and a channel estimate of the channel of link 2;

determining at the relay station the relative transmission parameter or a set of relative transmission parameters, wherein the relative parameter is based on one, or both, of the channel estimates characterizing each path;

obtaining from the receiver the common transmission parameter, or a set of common transmission parameters, based on the total communication quality experienced by the receiver;

using the relay station's respective relative transmission parameter and the common transmission parameter(s) to adapt the subsequent transmissions on link 2 on the reception of signal $y_k$, by transmitting the signal:

$$z_k = y_k \cdot \frac{1}{\varphi} \cdot \frac{\sqrt{P_{RS} \cdot \Gamma_{RS,k} \cdot \Gamma_{MS,k}}}{\sigma_{RS,k} \cdot (\Gamma_{RS,k} + \Gamma_{MS,k} + 1)} \cdot e^{-j \cdot (arg(h_{1,k}) + arg(h_{2,k}))}$$

wherein the parameters $\Gamma_{RS,k}$ and $\Gamma_{MS,k}$ are the locally determined relative transmission parameters based on the channel estimates, $\sigma_{RS}^2$ is the noise and interference level at the relay station, $P_{RS}$ is the aggregated transmit power from plural relay stations, and wherein the normalizing factor $\varphi$ is the common transmission parameter.

41. The method according to claim 37, further comprising determining a magnitude for the forwarded signal as a product of the relative transmission parameter and the common transmission parameter.

42. The method according to claim 37, wherein the common transmission parameter is a power normalization factor.

* * * * *

UNITED STATES PATENT AND TRADEMARK OFFICE
CERTIFICATE OF CORRECTION

PATENT NO. : 7,933,549 B2
APPLICATION NO. : 10/855888
DATED : April 26, 2011
INVENTOR(S) : Larsson It is certified that error appears in the above-identified patent and that said Letters Patent is hereby corrected as shown below:

On the Title Page, Item (56), under "U.S. PATENT DOCUMENTS" Line 1, after "Kokudo" insert -- 370/344 --, therefor.

Figure 4:
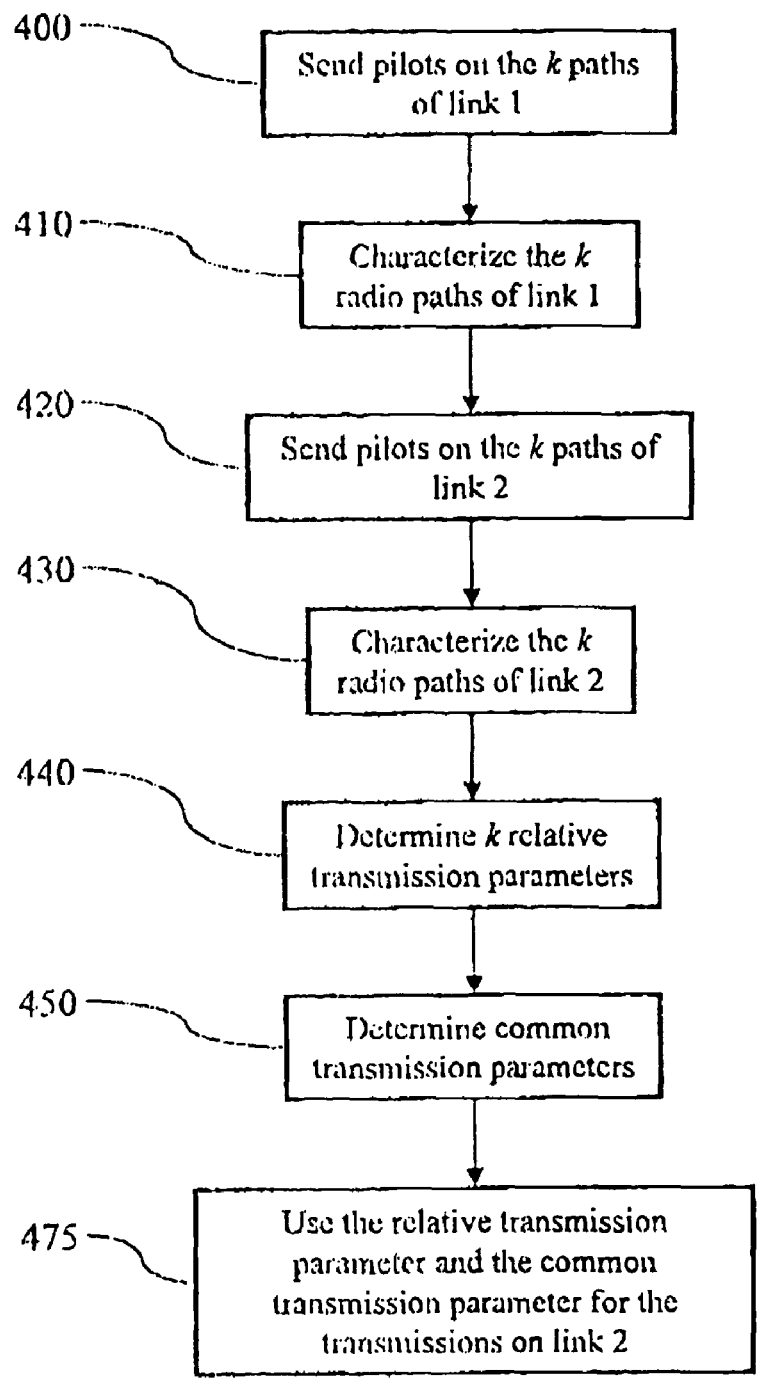
FIG. 4 is a flowchart over the method according to an example embodiment.

In Fig. 4, Sheet 3 of 8, delete Tag "475" and insert Tag -- 470 --, therefor. See attached In Column 1, Line 50, delete "relying," and insert -- relaying, --, therefor.

In Column 1, Line 55, delete "the systems" and insert -- these systems --, therefor.

In Column 2, Line 16, delete "process" and insert -- processes --, therefor.

In Column 2, Line 24, delete "from," and insert -- form, --, therefor.

In Column 2, Line 57, delete "not" and insert -- nor --, therefor.

In Column 2, Line 59, delete "multiple-access" and insert -- Multiple-access --, therefor.

In Column 3, Line 2, delete "foe" and insert -- for --, therefor.

Figure 1:
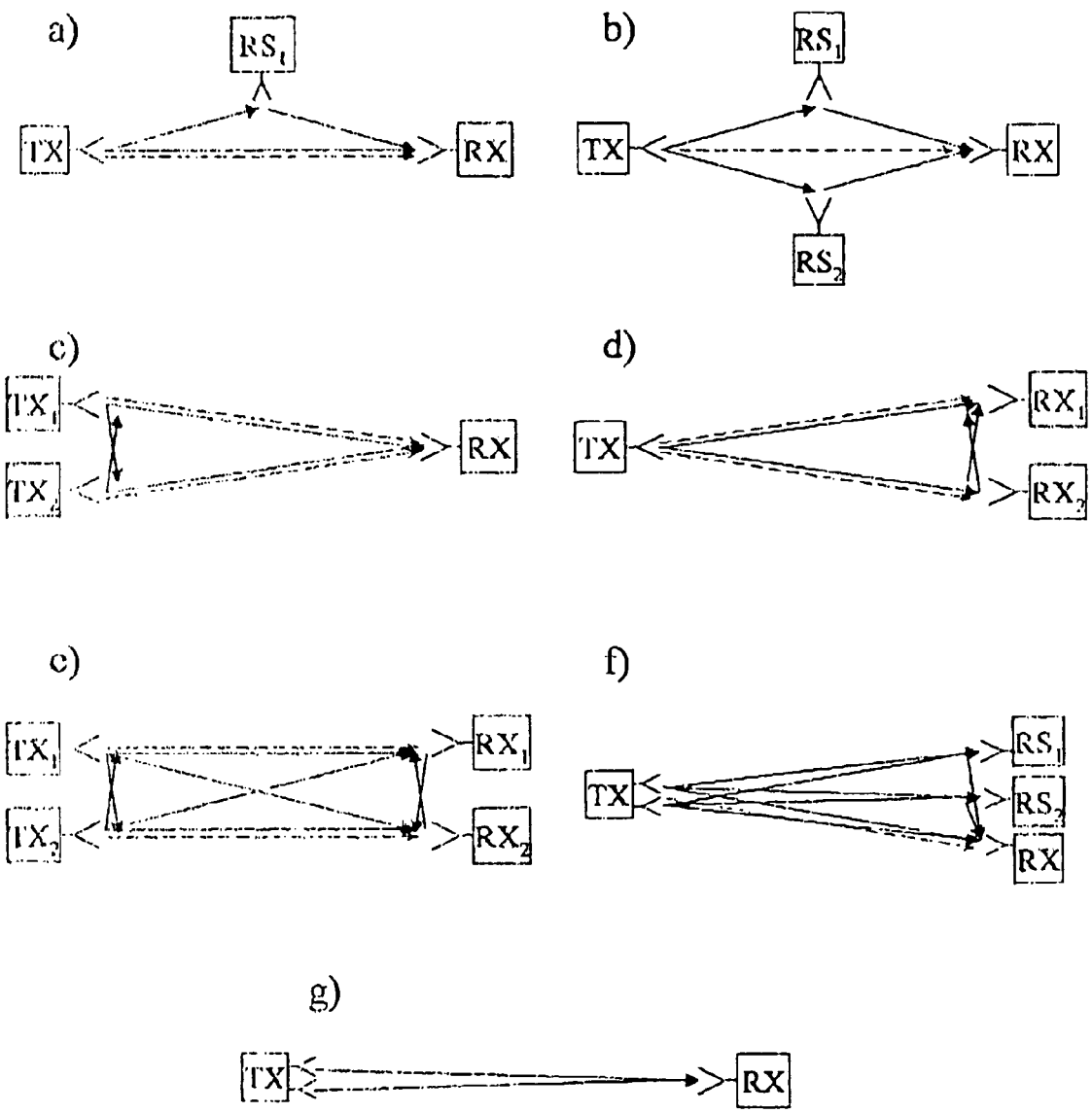
FIGS. 1a-g are schematic illustrations of the topologies of some prior art utilizing cooperative relaying.

In Column 3, Line 18, delete "FIG. 1c," and insert -- FIG. 1c is the so called interference channel with relaying, which is illustrated in FIG. 1c, --, therefor.

In Column 3, Line 42, delete "depicted" and insert -- described --, therefor.

In Column 3, Line 56, delete "obtained." and insert -- attained --, therefor.

In Column 4, Line 34, delete "link." and insert -- link --, therefor.

Signed and Sealed this
Twenty-ninth Day of May, 2012

David J. Kappos
*Director of the United States Patent and Trademark Office*

CERTIFICATE OF CORRECTION (continued)
U.S. Pat. No. 7,933,549 B2

In Column 4, Line 53, after "means for" insert -- determining relative transmission parameters based on channel characterization and means for --.

In Column 5, Line 43, after "description" insert -- in conjunction --, therefor.

In Column 6, Line 54, delete "parts" and insert -- parts: --, therefor.

In Column 6, Line 58, delete "220'" and insert -- 210' --, therefor.

In Column 7, Line 6, after "of" delete "a".

In Column 7, Line 7, delete "well" and insert -- will --, therefor.

In Column 7, Line 20, delete "optimize" and insert -- optimized --, therefor.

In Column 8, Line 4, delete "parameters" and insert -- parameter --, therefor.

In Column 8, Line 45, delete "also" and insert -- also an --, therefor.

In Column 8, Line 56, delete "one in" and insert -- one is in --, therefor.

In Column 9, Line 32, delete "path" and insert -- paths --, therefor.

In Column 9, Line 36, delete "path" and insert -- paths --, therefor.

In Column 9, Line 45, delete "parameter," and insert -- parameters, --, therefor.

In Column 9, Line 58, delete "transmission" and insert -- transmissions --, therefor.

In Column 9, Line 62, delete "other" and insert -- order --, therefor.

In Column 10, Line 14, delete "characterization" and insert -- characterizations --, therefor.

In Column 11, Line 13, delete "$\alpha_k$" and insert -- $a_k$ --, therefor.

In Column 11, Line 27, in Equation (3), delete "arg{$\alpha_k$}" and insert -- arg{$a_k$} --, therefor.

In Column 11, Line 46, delete "to the relay" and insert -- to relay --, therefor.

In Column 11, Line 62, delete "$\Sigma|\alpha_k|^2$" and insert -- $\Sigma|a_k|^2$ --, therefor.

In Column 12, Line 8, delete "transit" and insert -- transmit --, therefor.

In Column 12, Line 16, delete "$\Gamma_{eff}^{(max)}$" and insert -- $\Gamma_{Eff}^{(max)}$ --, therefor.

CERTIFICATE OF CORRECTION (continued)

In Column 12, Lines 44-45, delete "$e^{-j \cdot arg}(a^k)$" and insert -- $e^{-j \cdot arg}(a_k)$ --, therefor.

In Column 12, Line 46, delete "$arg\{\alpha_k\}$" and insert -- $arg\{a_k\}$ --, therefor.

In Column 13, Line 17, delete "is relay" and insert -- is the relay --, therefor.

In Column 13, Line 19, delete "$arg\{\alpha_k\}$." and insert -- $arg\{a_k\}$. --, therefor.

In Column 13, Line 41, delete "car" and insert -- can --, therefor.

In Column 13, Line 43, delete "$\alpha_k$." and insert -- $a_k$. --, therefor.

In Column 14, Lines 30-31, delete "distribution" and insert -- distributed --, therefor.

In Column 14, Line 46, delete "need" and insert -- need to be --, therefor.

In Column 15, Line 5, delete "than" and insert -- then --, therefor.

In Column 15, Line 24, delete "receiver" and insert -- received --, therefor.

In Column 15, Line 29, delete "including" and insert -- including the --, therefor.

In Column 15, Line 56, delete "source" and insert -- sources --, therefor.

In Column 15, Line 61, delete "$|\alpha_k|$" and insert -- $|a_k|$ --, therefor.

In Column 15, Line 62, delete "$\Sigma|\alpha_k|^2$," and insert -- $\Sigma|a_k|^2$, --, therefor.

In Column 16, Line 1, delete "$\Sigma|\alpha_k|$" and insert -- $\Sigma|a_k|^2$ --, therefor.

In Column 16, Line 2, delete "$\Sigma|\alpha_k|$the" and insert -- $\Sigma|a_k|^2$ the --, therefor.

In Column 16, Line 60, delete "the" and insert -- a --, therefor.

In Column 17, Line 11, delete "$|\alpha_k|^2$," and insert -- $|a_k|^2$, --, therefor.

In Column 17, Line 17, delete "steps" and insert -- substeps --, therefor.

In Column 17, Line 55, delete "combination" and insert -- contribution --, therefor.

In Column 17, Line 57, delete "receiver" and insert -- receiving --, therefor.

In Column 17, Line 57, delete "monetary" and insert -- momentary --, therefor.

In Column 17, Line 59, delete "cannel" and insert -- channel --, therefor.

CERTIFICATE OF CORRECTION (continued)
U.S. Pat. No. 7,933,549 B2

In Column 18, Line 37, delete "$\Gamma_{Active}$" and insert -- $\Gamma_{Active.}$ --, therefor.

In Column 18, Line 38, delete "to" and insert -- to the --, therefor.

In Column 18, Line 52, delete "the" and insert -- an --, therefor.

In Column 18, Line 52, delete "it" and insert -- it is --, therefor.

In Column 19, Line 15, delete "which" and insert -- with --, therefor.

In Column 19, Line 17, delete "receive" and insert -- receiver --, therefor.

In Column 19, Line 18, delete "ratio" and insert -- ratio or --, therefor.

In Column 19, Line 25, delete "$\alpha_k$" and insert -- $a_k$ --, therefor.

In Column 19, Line 28, delete "arg{$\alpha_k$}" and insert -- arg{$a_k$) --, therefor.

In Column 19, Line 62, delete "overall" and insert -- over --, therefor.

In Column 20, Line 6, delete "optically" and insert -- optionally --, therefor.

In Column 20, Line 17, delete "is" and insert -- if --, therefor.

In Column 20, Line 47, delete "relay." and insert -- relays. --, therefor.

In Column 20, Line 61, delete "in the" and insert -- in an --, therefor.

In Column 21, Line 16, delete "forwarded" and insert -- forward --, therefor.

In Column 21, Line 31, delete "equivalents" and insert -- equivalent arrangements --, therefor.

In Column 21, Line 42, delete "basestation to the" and insert -- basestation to --, therefor.

In Column 21, Line 49, delete "outer" and insert -- other --, therefor.

In Column 21, Line 64, delete "$\alpha_k$" and insert -- $a_k$ --, therefor.

In Column 22, Line 16, delete "signal," and insert -- signals, --, therefor.

In Column 22, Line 18, delete "arg{$\alpha_k$}" and insert -- arg{$a_k$} --, therefor.

In Column 22, Line 64, delete "$|\alpha_k|^2$" and insert -- $|a_k|^2$ --, therefor.

In Column 23, Line 64, delete "dominator" and insert -- denominator --, therefor.

CERTIFICATE OF CORRECTION (continued)
U.S. Pat. No. 7,933,549 B2

In Column 24, Line 2, delete "$|a_k| = \frac{c_{1,k}}{\sqrt{c_{2,k}}}$" and insert -- $|a_k| = \frac{c_{1,k}}{c_{2,k}}$ --, therefor.

In Column 24, Lines 15-18, in Equation, delete "$\frac{e^{-j(\arg(h_{1,k})+\arg(h_{2,k}))} \cdot \sqrt{\Gamma_{RS,k}} \sqrt{\Gamma_{MS,k}} \sqrt{\Gamma_{RS,k}+1}}{\Gamma_{RS,k}+\Gamma_{MS,k}+1}$"

and insert -- $\frac{e^{-j(\arg(h_{1,k})+\arg(h_{2,k}))} \cdot \sqrt{\Gamma_{RS,k}} \sqrt{\Gamma_{MS,k}} \sqrt{\Gamma_{RS,k}+1}}{\Gamma_{RS,k}+\Gamma_{MS,k}+1}$ --, therefor.

In Column 24, Lines 19-21, in Equation, delete "$\cdot \frac{\sqrt{P_{RS} \cdot \Gamma_{RS,k} \cdot \Gamma_{MS,k}}}{\sigma_{RS,k} \cdot (\Gamma_{RS,k} \cdot \Gamma_{MS,k}+1)} \cdot e^{j(\arg(h_{1,k})+\arg(h_{2,k}))}$"

and insert -- $\cdot \frac{\sqrt{P_{RS} \cdot \Gamma_{RS,k} \cdot \Gamma_{MS,k}}}{\sigma_{RS,k} \cdot (\Gamma_{RS,k} \cdot \Gamma_{MS,k}+1)} \cdot e^{-j(\arg(h_{1,k})+\arg(h_{2,k}))}$ --, therefor.

In Column 24, Line 34, delete "loop," and insert -- hop, --, therefor.

In Column 24, Line 36, delete "arg{α$_k$}" and insert -- arg{a$_k$} --, therefor.

In Column 24, Line 40, delete "|α$_k$|" and insert -- |a$_k$| --, therefor.

In Column 25, Line 8, delete "distributed" and insert -- Distributed --, therefor.

In Column 25, Line 17, delete "(WCNC-200)." and insert -- (WCNC-2000). --, therefor.

In Column 25, Line 24, delete "Bletsas" and insert -- Bletsas. --, therefor.

In Column 25, Lines 36-37, delete "System,"" and insert -- Systems," --, therefor.

In Column 26, Line 30, in Claim 8, delete "specifies," and insert -- specifies --, therefor.

In Column 27, Line 13, in Claim 13, after "comprises" delete "the step of".

In Column 27, Line 35, in Claim 14, delete "h$_{1,k}$" and insert -- h$_{l,k}$, --, therefor.

In Column 28, Line 4, in Claim 15, after "wherein the" delete "steps of".

In Column 28, Line 6, in Claim 15, after "and the" delete "step of".